United States Patent
Schultz et al.

(10) Patent No.: US 6,862,732 B1
(45) Date of Patent: Mar. 1, 2005

(54) METHOD AND APPARATUS FOR EVENT-DRIVEN PROCESSING OF DATA

(75) Inventors: Richard Kenneth Schultz, Woodbridge, CT (US); Howard Kent Gilbert, New Haven, CT (US); Ashish Suresh Deshpande, Guilford, CT (US)

(73) Assignee: Metaserver, Inc., New Haven, CT (US)

( * ) Notice: Subject to any disclaimer, the term of this patent is extended or adjusted under 35 U.S.C. 154(b) by 0 days.

(21) Appl. No.: 09/030,258

(22) Filed: Feb. 25, 1998

(51) Int. Cl.[7] .................................................. G06F 9/00
(52) U.S. Cl. ....................................... 718/102; 719/318
(58) Field of Search ................................. 718/102, 104, 718/105, 106; 719/318, 328, 320, 310; 709/202, 224, 300, 302, 102, 105, 310, 328, 203, 100, 104

(56) References Cited

U.S. PATENT DOCUMENTS

| | | | |
|---|---|---|---|
| 5,023,832 A | | 6/1991 | Fulcher, Jr. et al. ........ 364/900 |
| 5,075,847 A | * | 12/1991 | Fromme ..................... 395/700 |
| 5,155,842 A | * | 10/1992 | Rubin ........................ 395/575 |
| 5,237,684 A | * | 8/1993 | Record et al. .............. 395/650 |
| 5,283,856 A | * | 2/1994 | Gross et al. .................. 395/51 |
| 5,325,527 A | | 6/1994 | Cwikowski et al. ........ 395/650 |
| 5,325,530 A | | 6/1994 | Mohrmann ................. 395/700 |
| 5,337,360 A | * | 8/1994 | Fischer ........................ 380/23 |
| 5,341,499 A | | 8/1994 | Doragh ...................... 395/700 |
| 5,404,528 A | * | 4/1995 | Mahajan ..................... 395/650 |
| 5,414,845 A | | 5/1995 | Behm et al. ................ 395/650 |
| 5,448,739 A | * | 9/1995 | Jacobson .................... 395/700 |
| 5,493,689 A | * | 2/1996 | Waslawsky et al. ........ 395/821 |
| 5,506,999 A | * | 4/1996 | Skillman et al. ............ 395/800 |
| 5,522,073 A | * | 5/1996 | Courant et al. ............. 395/700 |
| 5,564,047 A | * | 10/1996 | Bloem et al. ............... 395/600 |
| 5,596,748 A | | 1/1997 | Kleewein et al. .......... 395/610 |
| 5,608,908 A | * | 3/1997 | Barghouti et al. .......... 395/703 |
| 5,619,655 A | | 4/1997 | Weng et al. ........... 395/200.11 |
| 5,621,892 A | * | 4/1997 | Cook ....................... 395/200.1 |
| 5,621,910 A | | 4/1997 | Nagamatsu ................. 395/379 |
| 5,625,837 A | | 4/1997 | Popescu et al. ............. 395/800 |
| 5,634,127 A | | 5/1997 | Cloud et al. ................ 395/680 |
| 5,680,597 A | | 10/1997 | Kumar et al. ............... 395/567 |
| 5,689,677 A | | 11/1997 | MacMillan ................. 395/433 |
| 5,689,681 A | | 11/1997 | Petersen ..................... 395/481 |
| 5,689,708 A | | 11/1997 | Regnier et al. ............. 395/682 |
| 5,692,128 A | | 11/1997 | Bolles et al. .......... 395/200.09 |
| 5,692,141 A | | 11/1997 | Kamisango et al. ........ 395/329 |
| 5,701,484 A | * | 12/1997 | Artsy ......................... 719/316 |
| 5,710,887 A | | 1/1998 | Chelliah et al. ............ 395/226 |
| 5,794,005 A | * | 8/1998 | Steinman .................... 395/500 |
| 5,896,495 A | * | 4/1999 | Stein et al. ............. 395/183.14 |
| 6,047,311 A | * | 4/2000 | Ueno et al. ................. 709/202 |
| 6,085,224 A | * | 7/2000 | Wagner ...................... 709/203 |
| 6,233,601 B1 | * | 5/2001 | Walsh ........................ 709/202 |

OTHER PUBLICATIONS

D. Garlan et al, "An Introduction to Software Architecture", School of Computer Science, Carnegie Mellon University, 1994.*

(List continued on next page.)

Primary Examiner—Sue Lao
(74) Attorney, Agent, or Firm—Wiggin and Dana LLP; Gregory S. Rosenblatt; Michael K. Kinney

(57) ABSTRACT

A data processing system that enables event modules to transmit event data to a module capable of processing the event data, generating a response, and when required producing a response profile to be sent to a location. The response is produced by the system executing one or more scripts to perform processing and gather data from processing modules. As the response is being generated by the execution of the script, the scripts self-modify based upon the data gathered. The system recognizes the necessary changes and dynamically generates a response to the changes. If the response profile must be transmitted to another location, the response profile will be in a format that the receiving location will recognize.

50 Claims, 14 Drawing Sheets

OTHER PUBLICATIONS

D. Lamer, et al, "A Distributed, Operating System Based, Blackboard Architecture for Real–Time Control", ACM, pp. 99–108, 1990.*

M. Hewett, et al, "A Language and Architecture for Efficient Blackboard Systems", IEEE, pp. 34–40, 1993.*

J. Chen, et al, "Distributed Fault Management over ATM Networks", IEEE, pp. 196–201, 1997.*

U. Dayal, et al, "Organizing Long–Running Activities with Triggers and Transactions", IEEE, pp. 204–214, 1990.*

B. Krishnamurthy, et al, "An Event–Action Model of Computer–Supported Cooperative Work: Design and Implementation", Informatik, Informationen Reporte, No. 4, pp. 132–145, Apr. 1991.*

B. Krishnamurthy, et al, "Yeast: A General Purpose Event–Action System", IEEE Tran. Software Eng. vol. 21, No. 10, pp. 845–857, Oct. 1995.*

H. Jasper, "Active Database for Active Repositories", IEEE, pp. 375–384, 1994.*

* cited by examiner

METHOD AND APPARATUS FOR EVENT-DRIVEN PROCESSING OF DATA

BACKGROUND OF THE INVENTION

1. Field of the Invention

This invention relates to an event-driven data processing software system having multiple software modules for processing data in communication with one another. More particularly, this invention relates to a software system having a task module that executes self-modifying scripts, thereby invoking active responses from data processing modules based upon event data that is transmitted to the task module from other modules.

2. Brief Description of the Background

Conventional methodology for accessing network application data can be cumbersome. For example, in order for a client/user to access data from a network application, it is typically necessary for the network application and the application protocol to be modified to enable the client/user protocol to recognize them. This modification is inefficient because it necessitates the conversion of server application programs to another protocol in order to access data desired by the client. In other words, the network application and the client/user may not be able to communicate with each other because of different native applications or protocols.

A second example of the cumbersome nature of conventional network interactions is illustrated by the fact that network applications and data are typically not dynamically updated based upon sequential or simultaneous activities or events that are taking place in other network applications.

There have been attempts to address some of these inefficiencies and shortcomings. Unfortunately, as can be seen from the following discussion, these attempts fail to provide a means for dynamically processing data from a variety of network applications.

U.S. Pat. No. 5,325,527 (Cwikowski et al.) discloses a client/server communications system utilizing a self-generating nodal network. Each service node includes both process steps for advertising a service to the server root node and process steps for building a topic node which includes both process steps for accessing a server and process steps for building a job node in order to store job requests. The service nodes include steps for communicating with an application program and steps to create a job request in accordance with a job request designated by the application program. However, the Cwikowski et al. patent fails to recognize the need for a system that receives data and utilizes self-modifying commands to gather additional data from a plurality of processors in order to "update" itself or to incorporate the additional data, much less to disclose a system that addresses such needs.

U.S. Pat. No. 5,325,530 (Mohrmann) discloses a controller for sequential programming tools executed in a parallel-computing environment. This controller executes sequential tools on an individual node of a parallel computing system. The controller associates each tool with a particular process of a user program executing on a particular node. In particular, the controller, in combination with various debugging tools operating on various nodes in the parallel-computing environment, produces a parallel program debugger. Unfortunately, the invention disclosed in the Mohrmann patent merely performs steps sequentially, and does not disclose a system that dynamically modifies steps that have yet to be performed.

U.S. Pat. No. 5,625,837 (Popescu et al.) discloses a processor architecture having out-of-order execution, and speculative branching capabilities that give priority to instructions that affect a condition code. This process architecture uses instruction fetching functions that are decoupled from instruction execution functions by a dynamic register file. More specifically, the results of the executed instructions are flushed from provisional storage, and the instruction previously executed at the beginning of a branch based upon predicted dependencies is re-executed based upon the actual data that subsequently becomes available. However, the Popescu et al. patent fails to disclose gathering processed data from a network, much less a system that dynamically incorporates the gathered processed data in order to "learn" from it.

U.S. Pat. No. 5,634,127 (Cloud et al.) discloses methods and apparatus for implementing a message driven processor in a client-server environment. This message driven processor operates as middleware between clients and back-end hosts or servers in a large client-server system to reduce the number of concurrent sessions required to be supported by the network and to allow a common client-user interface to divergent back-end systems. The Cloud et al. patent teaches a message queue for storing data but does not disclose mapping a message to a set of commands that is self-modifying, much less a system that incorporates gathered data into the system.

U.S. Pat. No. 5,689,708 (Regnier et al.) discloses a client/server computer-system that controls a) client-based application programs and b) application-programs. A resource manager and a client/server computer network control the availability of system resources. A system administrator generates a set of profiles that specifies which system resources each user may employ for each of multiple application programs. The Regnier et al. patent discloses resource management, but does not disclose that the resource management capabilities interact with multiple databases to gather processed data for use in the system.

As can be seen from the illustrative background discussed above, there is a need in the computer-programming field for a data processing system that 1) has the capability to receive requests from a variety of applications, which operate in a variety of environments, and 2) provides an appropriate response. The present invention provides a solution to that need in the form of an event-driven data processing system that utilizes series of self-modifying commands to receive event data signals and to generate an appropriate response, and updates the self-modifying commands in response to the event data.

SUMMARY OF THE INVENTION

In one aspect, the present invention relates to a software system that enables event modules to transmit event data to a task module, which utilizes a script, or a series of instructions, to respond to the event data. The task module executes the series of instructions necessary to generate response data. The instructions executed in the script are dynamically modified based on the results of data gathered by the script. The task module executes the script by performing processing on, and potentially gathering data from, requisite processing modules. A response profile can be generated that represents the combined or cumulative results of the series of instructions. Upon completion of the series of instructions, the response profile can be assembled from the response data, and transmitted from the task module to an application program or a user, which is typically the originating event module. A response profile is transmitted only in situations in which a response is necessary.

In another aspect, the present invention relates to a data processing system stored on a computer-readable medium. This system comprises:

one or more event modules for generating event data signals representative of a particular event;

one or more scripts each of said one or more scripts having one or more instructions;

one or more processing modules for providing said one or more scripts with processed data;

a task module, communicating with each of said one or more event modules, for executing a selected one of said one or more scripts that corresponds to said event data signals;

whereby during said execution, said selected script interfaces with one or more of said one or more processing modules based upon said one or more instructions and said selected script incorporates the results of said interfacing into said one or more instructions of said selected script.

This invention can further include a resource management module in direct communication with said one or more event modules, said task module and said one or more processing modules for dynamically assigning processing functions to said one or more processing modules; and an administrative module in direct communication with said task module, said one or more event modules, said one or more processing modules and said resource management module, for receiving and presenting data relating to said one or more processing modules.

In still another aspect, the present invention relates to a method of data processing. This method comprises the steps of:

generating event data signals at one or more peripheral modules;

transmitting said event data signals from said one or more peripheral modules to a task module;

receiving, at said task module, said event data signals transmitted from said one or more peripheral modules;

mapping, at said task module, said event data signals to a selected script of one or more scripts, each said one or more scripts having one or more instructions for performing data gathering steps; and executing, by said task module, said selected script to gather processed data from one or more of said one or more peripheral modules;

wherein during said execution, said selected script dynamically incorporates results of said executing into said one or more instructions, thereby affecting said data gathering steps.

In still another aspect, the present invention relates to an event-driven data processing system. This system comprises:

generating means for generating event data signals;

transmitting means communicating with said generating means for transmitting said event data signals;

converting means communicating with said transmitting means for recognizing the event data signals and mapping said, event data signals to a selected set of self-modifying process steps;

executing means for executing said selected set of self-modifying process steps;

processing means for providing processed data to said executing means; and incorporating said processed data into said selected set of self-modifying process steps thereby determining the manner in which said selected set of self-modifying process steps is executed.

In yet still another aspect, the present invention relates to a process for generating a plurality of operational commands for gathering data for storing on a computer-readable medium. This process comprises:

collecting inputs from at least one source of information;

processing the inputs to generate at least one set of self-modifying commands that can be executed; and utilizing the executed set of self-modifying commands to respond to an event data signal.

These and other aspects of the present invention will become apparent upon reading the following detailed description of the invention.

DETAILED DESCRIPTION OF THE INVENTION

Figure 1:
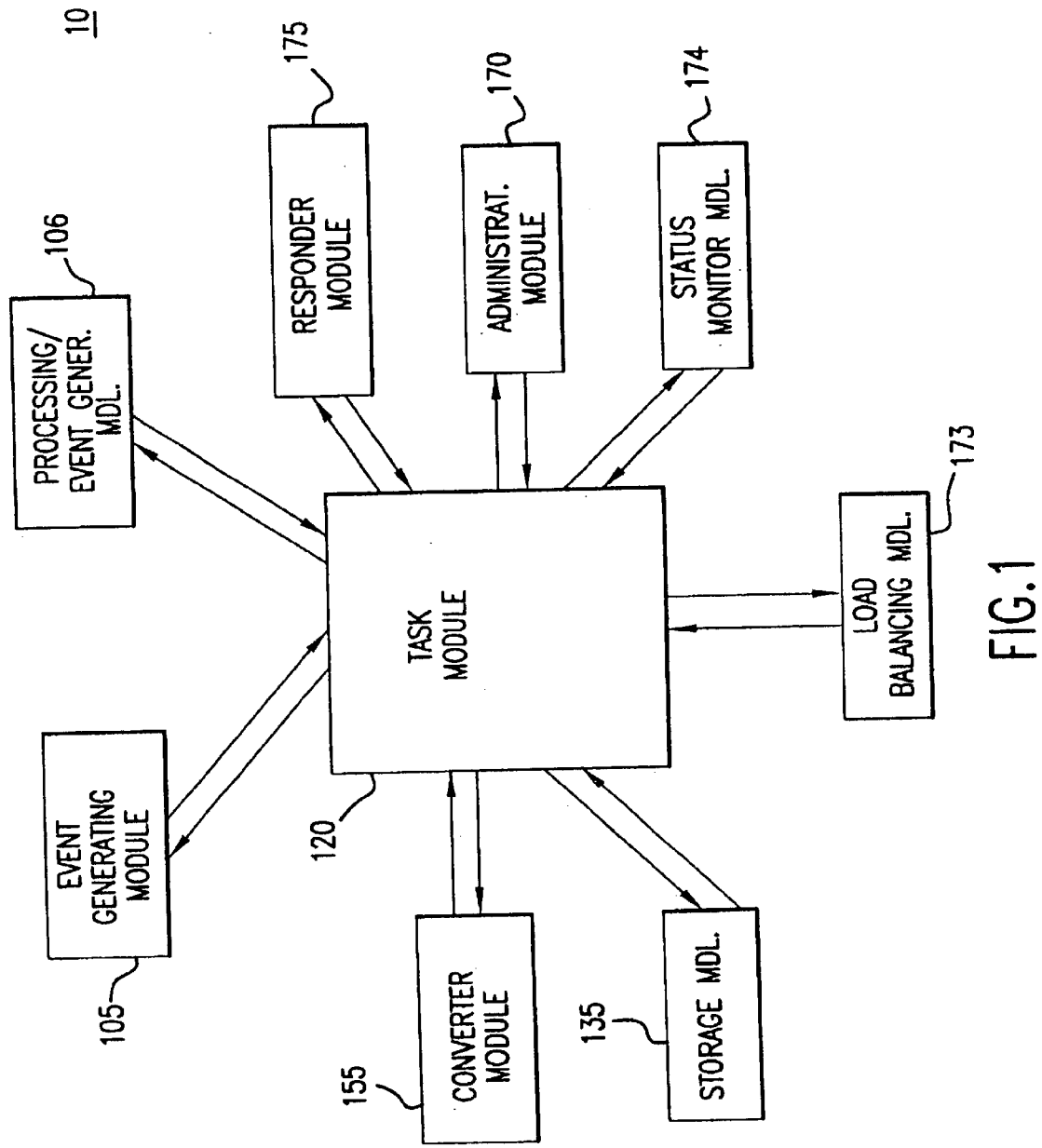
FIG. 1 is a diagram of the event data processing system in accordance with the present invention.

It has been found in accordance with the present invention that data received from various applications in a data processing system can be used to access a series of self-modifying instructions. The self-modifying instructions perform steps required to process the data received. After the first instruction of the series is executed, the remaining instructions may be modified based upon the results of the execution of a previous instruction. This method is repeated with respect to the second instruction and, by repeated iterations the system "learns" by virtue of data provided from previous instructions.

The present invention describes a software system that can coordinate a plurality of software modules such that data, generated by a processing module or a user/client module, may be employed by a task module to perform processing. The task module is suitably employed to generate a response to the data generated in a situation in which a response is required or desired. The software modules are programs, and/or subprograms, and/or functions within programs, or any combination of programs, subprograms and functions within programs (generally referred to as "code"). The modules are suitably stored in a computer-readable, and/or computer-writeable media. The system may optionally be fabricated using conventional computer hardware and/or optionally fabricated from a combination of hardware and software.

The software architecture of the present invention may be described in terms of a hub and spoke module system. Peripheral modules represent spokes and include 1) event modules, such as a user station that inputs request data, and 2) processing modules, such as application programs. A task module to coordinate events and processing represents the hub.

The task module is in single-directional or bi-directional communication with at least one peripheral module and typically a plurality of peripheral modules. The task module can be employed to substantially simultaneously and/or sequentially interface with a plurality of peripheral modules to receive event data and process the received data.

The task module uses data transmitted from the event modules to access a script. Each script contains a series of preprogrammed commands, which may require interfacing with processing modules when executed. The execution includes creation of a response profile that addresses event data. The task module executes the instructions by invoking actual processing or processing modules, and by gathering data from the necessary processing modules. The requisite processing modules depend upon the commands in the script. The task module incorporates information gathered from each of the processing modules and thereby updates and modifies the set of instructions in a self-describing fashion.

The script may have a memory that dynamically keeps track of modifications to the script itself. As the steps are being performed, affected application programs receive accurate and dynamic information regarding the status of other processing modules and result data generated. The script incorporates the information into the instructions and thereby modifies the action taken by the script.

FIG. 1 shows the event-data processing system 10 having a task module 120 and examples of peripheral modules in communication with the task module. The functions of event generating module 105, processing/event generating module 106, responder module 175, administrative module 170, status monitoring module 174, load balancing module 173, storage 135 and converter module 155 will be described in detail in the discussion of FIG. 2.

It should be noted that the communication between modules in system 10 may be either bi-directional or single-directional depending on the type of data being transmitted between the modules.

Figure 2:
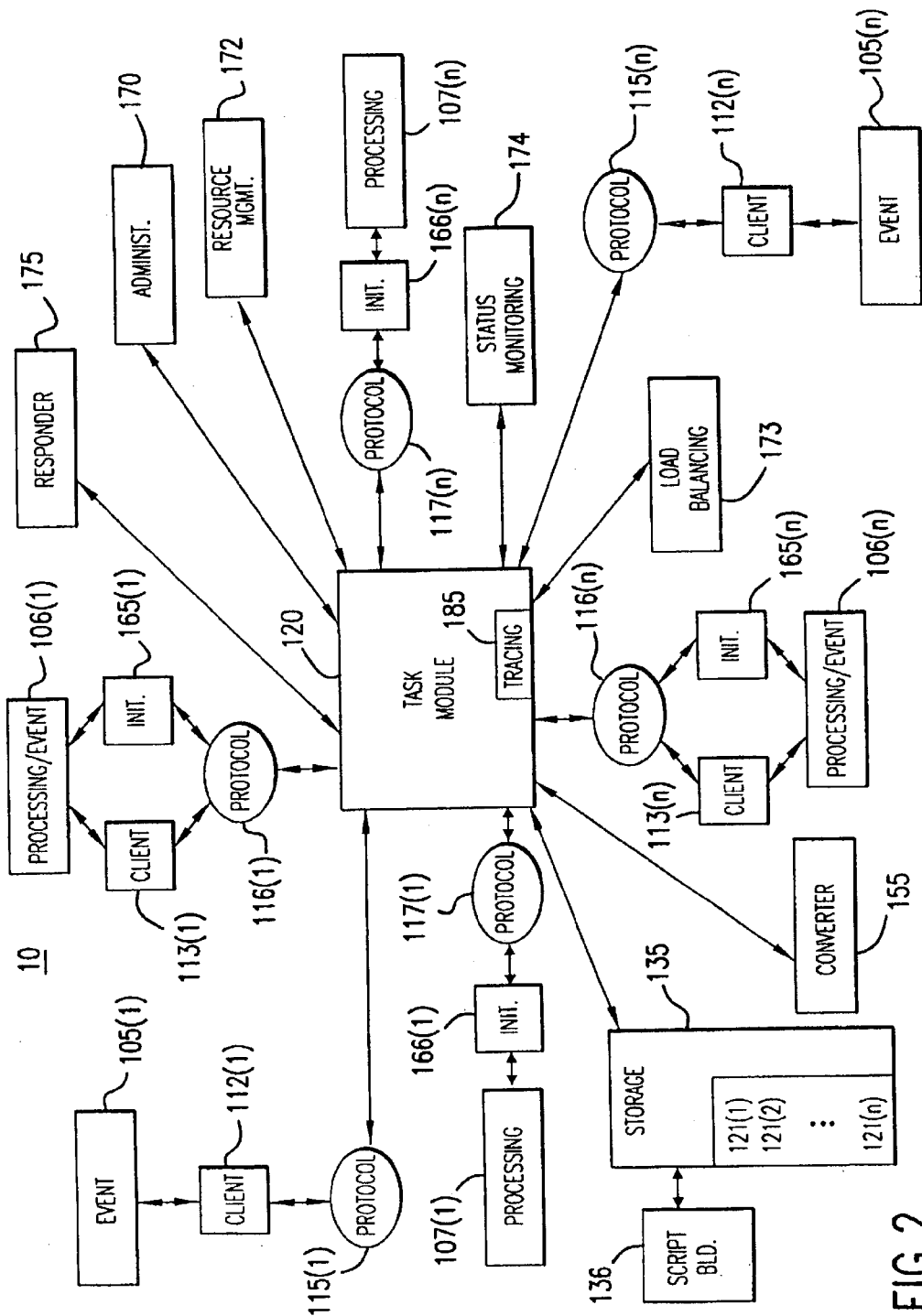
FIG. 2 shows a plurality of modules that may be used in the present invention.

FIG. 2 shows the system 10 in greater detail. The task module 120 is in communication with a plurality of event data generating modules 105(1) . . . (n), a plurality of processing modules 106(1) . . . (n), and 107(1) . . . (n) (n being an arbitrary integer), a converter module 155, storage 135, a responder module 175, a resource management module 172, a load balancing module 173, a status-monitoring module 174, and an administrative module 170. It should be noted that the modules of this embodiment are not all necessary parts of the invention, but they provide the context in which the preferred embodiment will be described.

Task Module

Task module 120 is suitably employed to receive event data from one or more event modules 105(1) . . . (n), and may optionally receive event data from one or more processing modules 106(1) . . . (n). The task module 120 utilizes scripts 121(1) . . . (n) (n being an arbitrary number), that can be stored in storage 135. These scripts 121(1) . . . (n) are comprised of a series of instructions and/or commands. Upon execution of the script, the instructions are used to direct the steps the script takes to gather data. These scripts 121(1) . . . (n) correspond to particular event data received by the task module 120.

The scripts 121(1) . . . (n) are retrieved by the task module 120. The task module 120 executes the retrieved script e.g. 121(1). The particular script e.g. 121(1) invokes required ones of processing modules 106(1) . . . (n) and 107(1) . . . (n) to do processing and to gather data from those modules. These scripts 121(1) . . . (n) enable the task module 120 to respond to particular event data received by interfacing with or "visiting" a requisite number of processing modules 106(1) . . . (n), 107(1) . . . (n). The processing modules 106(1) . . . (n) and 107(1) . . . (n) perform the necessary processing to provide the task module 120 with the desired data.

Each script 121(1) . . . (n) is executed to perform the instructions and/or commands programmed into that script. Upon gathering data from a particular processing module, the steps to be executed may change based upon the data gathered from the processing modules. The execution of a script 121(1) . . . (n) utilizes the gathered data to modify the next step in the script. The task module 120 can execute a plurality of scripts 121(1) . . . (n) substantially simultaneously.

The task module 120 is programmed to invoke available processing modules to respond to a data request. Therefore, if any one of the processing modules 106(1) . . . (n), 107(1) . . . (n) is occupied at the time the task module 120 seeks to invoke that module, the task module will route the request to an available processing module that can process the request or, if there are not any processing modules available, wait for the next available processing module, thus providing load-balancing of modules in the system 10.

The task module 120 is in communication with processing modules 106(1) . . . (n), 107(1) . . . (n), event modules 105(1) . . . (n), converter module 155, resource management module 172, load balancing module 173, status monitoring module 174, responder module 175, script building module 136, and storage module 135. Task module communication with these modules may be bi-directional or single-directional, depending upon the type of data being transmitted. This enables the task module 120 to transmit and/or receive data from each of these modules.

It should also be noted that the task module is able to interface with multiple modules in parallel such that more than one module in the system 10 may be in communication with the task module 120 at one time. Parallel processing of data facilitates communication between peripheral modules through the task module since the task module 120 can be simultaneously transmitting and receiving data. This feature reduces the amount of time required to execute scripts 121(1) . . . (n) because multiple steps in a script can be executed substantially simultaneously. Parallel processing also prevents modules in the system 10 from being affected by the failure of a particular module because the task module 120 will not access a malfunctioning or non-functioning module in system 10. The task module 120 receives information relating to the operating status of modules in the system 10 from status monitoring module 174, which keeps track of modules that have failed or are malfunctioning and proceeds so as to avoid interaction with such modules. This insulates the other peripheral modules in the system 10 from interfacing with a failed module.

It is possible for the system 10 to include a plurality of task modules. Running a plurality of task modules substantially simultaneously is advantageous to facilitate increased event-driven data processing capabilities and fault tolerances.

The task module 120 may also include a tracing module 185 that performs the function of storing the status of the data gathering and processing procedure when a script e.g. 121(1) is executed. Thus, if a processing module experiences failure, the script 121(1) and processing already completed by script 121(1) will not be lost and processing can continue without interruption. The tracing module 185 increases the reliability of the system 10. This status-monitoring feature is inherent in the task module, but may also be programmed into a separate module in communication with the task module.

As the task module 120 executes a particular script 121(1), the results of the execution form a response profile that may be stored in the script 121(1) and/or may be stored in storage 135. When the last step of the script 121(1) has been executed, the complete response profile may be stored in storage 135 or transmitted to a user location, such as event module 105(1), or discarded.

Event Modules

Event modules 105(1) . . . (n) are in communication with task module 120. Event modules 105(1) . . . (n) generate data relating to a particular event or request. Examples of events include a request to purchase an item from a Web browser, the status of a database, the status of inventory, that a database needs attention, etc. This information is transmitted to a task module 120, which is in communication with the event modules 105(1) . . . (n), and receives the event data from the event modules 105(1) . . . (n). Event modules 105(1) . . . (n) are not used by system 10 to perform data processing. Examples of event modules 105(1) . . . (n) include portable software that can run on a variety of hardware devices such as user terminals, personal computers or back office machines running a variety of operating systems.

Event data can also be generated by processing modules 106(1) . . . (n). These modules can both process data and generate event data. Both types of modules 105(1) . . . (n) and 106(1) . . . (n) can receive signals from task module 120 representing a response to event data.

Processing Modules

Processing modules 106(1) . . . (n) and 107(1) . . . (n) are in communication with the task module 120 such that they can receive signals that request processing and data. Processing modules 106(1) . . . (n) and 107(1) . . . (n) also transmit processed data to the task module 120. Examples of processing modules 106(1) . . . (n) and 107(1) . . . (n) include various application programs such as databases, client-server applications, network applications and server applications. Processing modules 106(1) . . . (n) and 107(1) . . . (n) are not required to be dedicated and may be in communication with network application peripherals or systems outside system 10.

One difference between processing modules 106(1) . . . (n) and 107(1) . . . (n) is that processing modules 106(1) . . . (n), in addition to being modules capable of performing data processing, are also capable of generating event data in a fashion similar to event modules 105(1) . . . (n).

For example, processing module 106(1) may be an inventory database that processes requests, received from task module 120, to retrieve the quantity of a particular item in inventory. When running with an event module, the processing module 106(1) may also generate event data, such as the fact that inventory has been depleted below a pre-specified quantity. Module 106(1) can then transmit that data to the task module 120 because it has dual functionality of event generation and data processing. The processing modules 106(1) . . . (n) may be in communication with a corresponding client module 113(1) . . . (n), which can facilitate event generation interfacing with the task module 120. Other examples of processing modules 106(1) . . . (n) include network applications, network servers and main frame applications.

Processing modules 107(1) . . . (n) do not include an event module and therefore do not generate event data, but may merely exchange information to the task module 120 upon interfacing the task module 120. This interfacing can be facilitated by the use of an associated initiator module 166 (31) . . . (n).

Initiator Modules

Initiator modules 165(1) . . . (n) and 166(1) . . . (n) may be disposed between task module 120 and processing modules 106 and 107(1) . . . (n), respectively, (i.e., initiator modules 165(1) . . . (n) are associated with modules 106(1) . . . (n) and initiator modules 166(1) . . . (n) are associated with modules 107(1) . . . (n)). Initiator modules 165(1) . . . (n) and 166(1) . . . (n) translate data signals sent between task module 120 and processing modules 106(1) . . . (n) and 107(1) . . . (n). The initiator modules 165(1) . . . (n), 166(1) . . . (n) may be built into the associated processing module. Alternatively, initiators 165(1) . . . (n) and 166(1) . . . (n) may be separate modules that store information pertaining to the corresponding processing module 106(1) . . . (n) and 107(1) . . . (n) respectively. For example, initiator 165(1) could maintain accumulated data related to processing module 106(1). Initiator 165(1) can interface with the task module 120, and enable the task module 120 to derive and gather information related to processing module 106(1) without examining all of the contents in processing module 106(1). Thus, the task module 120 may merely interface with the corresponding initiator module i.e., 165(1) and thereby gather all the necessary information. Likewise, the task module 120 may use the initiator modules 165(1) . . . (n) and 166(1) . . . (n) to transmit information to associated processing modules 106(1) . . . (n) and 107(1) . . . (n), respectively.

Client Modules

Interfacing between the task module 120 and event modules 105(1) . . . (n) and 106(1) . . . (n) (note that processing modules 106(1). (n) may also perform event data generation) may be corresponding client modules 112(1) . . . (n) and 113(1) . . . (n), respectively (n being an arbitrary integer). Client modules 112(1) . . . (n) and 113(1) . . . (n) may be used to translate and store event data that is transmitted to the task module 120 from the modules 105(1) . . . (n) and 106(1) . . . (n) or response data that may be transmitted from the task module 120 to the modules 105(1) . . . (n) and 106(1) . . . (n). Examples of client modules 112(1) . . . (n) and 113(1) . . . (n) include C++ clients, JAVA clients (JAVA is a registered trademark of Sun Microsystems, Inc. of Mountain View, Calif.), ACTIVE X clients (ACTIVE X is registered trademark of Microsoft Corp. of Redmond, Wash.) and Web clients.

Protocols

Additionally, between the client modules 112(1) . . . (n) and task module 120 may be protocols 115(1) . . . (n) (n being an arbitrary integer). Each client module 112(1)...(n) may interface with a corresponding protocol 115(1)...(n) that is between the client module 105(1)...(n) and the task module 120. As can be seen from FIG. 2, the protocols 115(1)...(n) may be between the task module 120 and the corresponding event module 105(1)...(n). In a similar fashion, protocols 116(1)...(n) are associated with a corresponding processing module 106(1)...(n). Protocols 117(1)...(n) may be associated with corresponding processing modules 107(1)...(n). Protocols 115(1)...(n), 116(1)...(n) and 117(1)...(n) may be standard protocols or nonstandard protocols. Examples of standard protocols include COM (COM is a registered trademark of Microsoft Corp. of Redmond, Wash.), JAVA BEANS (JAVA BEANS is a registered trademark of Sun Microsystems, Inc. of Mountain View, Calif.), Corba and TCP/IP.

The protocols 115(1)...(n), 116(1)...(n) and 117(1)...(n) enable the task module 120 to communicate with other peripheral modules in system 10 regardless of the manufacturer or native application of a particular peripheral module or network hardware and software.

Converter Module

Converter module 155 is in communication with the task module 120 and receives event data from the task module 120 (this event data was received by the task module 120 from another module in system 10) for the purpose of performing a mapping function. The converter module 155 recognizes event data and maps specific event data to a particular script, or set of instructions 121(1)...(n), to respond to the received event data. Once a particular script, e.g. 121(1), is mapped to a particular event, the converter 155 transmits the appropriate signal so that the task module 120 can "fetch" or retrieve the appropriate script, e.g. 121(1) from storage 135. It should be noted that although only one converter module 155 is shown in FIG. 1, there could be a plurality of converter modules used in system 10.

Script Building Module

Script building module 136 may be used to construct a script or to modify an existing script. The script, or set of instructions 121(1)...(n), performs a desired function in response to event data. The set of instructions may be a series of commands or a single command. Examples of instructions included in a script are running a process such as a database, "If...then...else" statements, and standard flow charting steps to perform a particular task. Programming a script in this fashion enables the script to dynamically change based upon the commands that have been executed. Thus, upon performing the first instruction in a script e.g. 121(1), the script 121(1) will receive data. The data received will be incorporated into the script 121(1) and will determine how the script 121(1) proceeds.

The script building module 136 may generate scripts 121(1)...(n) through a graphical user interface or a programming interface. This programming interface may be a language level interface that generates a plurality of operational commands. When executed, the commands of the scripts 121(1)...(n) perform processing on, and gather information from, processing modules 106(1)...(n) and 107(1)...(n). The commands of the scripts may also interface with event modules 105(1)...(n) and 106(1)...(n) to collect event data. Thus, once the script building module 136 generates the commands, the commands may then be executed by the task module 120.

Once a script, e.g. 121(1), has been created by the script building module 136, it may be accessed at a later time. The script building module 136 also enables a script created earlier to be modified by retrieving a script and revising it to include commands that were not previously included or to remove commands that are no longer desired. The scripts 121(1)...(n), after being created, may be saved in storage module 135. System 10 may utilize a plurality of script building modules.

Storage Module

Storage module 135 may be in communication with all of the modules of system 10 directly or via task module 120. The storage module 135 may be, for example, any form of computer-writeable media, computer-readable media, and/or memory bank. If a memory bank is utilized, all modules on a network can communicate with each other through that memory. Specific examples of computer-writable and readable media include floppy disk, hard disk and memory. The storage module 135 can include any size memory and is only limited by the amount of storage available on the computer containing the storage module. Storage module 135 has the capacity to store data pertaining to the operation of any of the modules in system 10. For example, storage module 135 may store scripts 121(1)...(n), and may also store scripts that are being executed by the task module 120, as well as resource management data from resource management module 172, system administration data from administrative module 170, status monitoring data from status-monitoring module 174, load-management data from load balancing module 173 and responder module data from responder module 175. Furthermore, storage module 135 may act as a queue, storing event data that has not been processed by task module 120. Storage module 135 may also store result data that is gathered by the execution of scripts 121(1)...(n).

Responder Module

Responder module 175 is in communication with the task module 120 and provides a translation function on the response data generated by the task module 120, as a result of execution of a script 121(1)...(n). The responder module 175 outputs a response profile, which may be transmitted via the task module 120 or transmitted directly from the responder module 175 to the event modules 105(1)...(n), 106(1)...(n), in a format that the event modules 105(1)...(n), 106(1)...(n) can recognize.

Resource Management Module

Resource management module 172 is used to dynamically allocate processing module function of processing modules 106(1)...(n) and 107(1)...(n) based on information received from task module 120. The resource manager module 172 keeps track of the assigned functionality of processing modules 106(1)...(n) and 107(1)...(n). The resource managing module is in bi-directional and single-directional communication with the task module 120 and keeps track of the nature of the event data being received by task module 120. The resource management module 172 may also be in direct communication with other peripheral modules such as event modules 105(1)...(n) and processing modules 106(1)...(n), 107(1)...(n).

The resource managing module 172 monitors system information such as how many processing modules are available for a particular task, the amount of event data that has not been processed, and the load average and statistics concerning the processing modules 106(1)...(n) and 107(1)...(n). The resource managing module 172 allocates processing module function based upon dynamic system needs. This enables the task module 120 to operate more efficiently since the availability of processing modules 106(1) ... (n), 107(1) ... (n) that can perform the required tasks is maximized. An example of this is a situation in which processing modules 106(1) and 107(1) perform selling features. When an increased number of purchase requests are received, the resource managing module 172 can convert modules 106(1) and 107(1) from selling modules to purchasing modules. This provides more purchasing modules to perform processing for the task module 120.

Administrative Module

Administrative module 170, which is in communication with the task module 120, receives data from the task module 120 relating to system maintenance and storage ability. Alternatively, the administrative module can be in communication with any other module in the systemic directly. The administrative module is programmed to allow users to start and stop data processing activities and keep track of activities of the modules in system 10. The administrative module 170 also presents accumulated data to enable proper maintenance of system 10. For example, administrative module 170 could be a software program that outputs messages regarding the status of processing modules 106(1) ... (n), 107(1) ... (n). Administration module 170 can also start and stop initiators 165(1) ... (n) and 166(1) ... (n) and thereby control the operation of the system 10.

Load Balancing Module

Load balancing module 173 is a peripheral module in communication with the task module 120 and may be in direct communication with other peripheral modules. Load balancing module 173 monitors the contents of task module 120, storage module 135 and processing modules 106(1) ... (n) and 107(1) ... (n). The function of load balancing module 173 is to determine which processing modules 106(1) ... (n) and 107(1) ... (n) are available to receive processing requests. This enables processing modules 106(1) ... (n) and 107(1) ... (n) that are not busy to receive requests required by task module 120 and, thereby, provide for more efficient operation of system 10. The load balancing module 173 could run on task module 120 or be a separate module 173.

Status Monitoring Module

Status monitoring module 174 is in communication with the task module 120, and may be in direct communication with the other modules of system 10. The status monitoring module 174 monitors the operational status of each processing module 106(1) ... (n), 107(1) ... (n) to ensure that a processing request is not sent to an inoperative processing module by task module 120. Status monitoring module 174 also has storage to save the current status of a script 121(1) ... (n) that is being executed. If a script e.g. 121(1) is interfacing with a processing module and that processing module fails, the script 121(1) will not be lost. Rather, the status monitoring module 174, which stores each script being executed, enables the task module 120 to continue the execution of the script from the last command executed. The status monitoring module may store the particular script in storage within the status monitoring module or in storage module 135. This feature adds reliability and efficiency to system 10 since if a processing module fails, it will not disturb the execution of a script.

Additionally, the status monitoring module 174 will not access a failed processing module, but will communicate with the task module 120 so that only properly functioning processing modules are accessed. The status monitoring functions may run on the task module 120 or may be a distinct module 174.

Thus, as shown in FIG. 2, the system 10 may be described as a hub-and-spoke configuration of software modules with a task module 120 in communication with peripheral modules 105(1) ... (n), 106(1) ... (n), 107(1) ... (n), 155, 135, 136, 170, 172, 173, 174 and 175 that perform specific functions. The system 10 also includes client modules 112(1) ... (n) and 113(1) ... (n) and initiator modules 165(1) ... (n), 166(1) ... (n) to facilitate interfacing with associated peripheral modules. Protocols 115(1) ... (n), 116(1) ... (n) and 117(1) ... (n) may also be used between the task module 120 and corresponding peripheral modules. It should be noted that although FIG. 2 shows an embodiment using only one of certain modules, the system 10 may have a plurality of any of the modules for faster and more reliable performance.

Figure 3A:
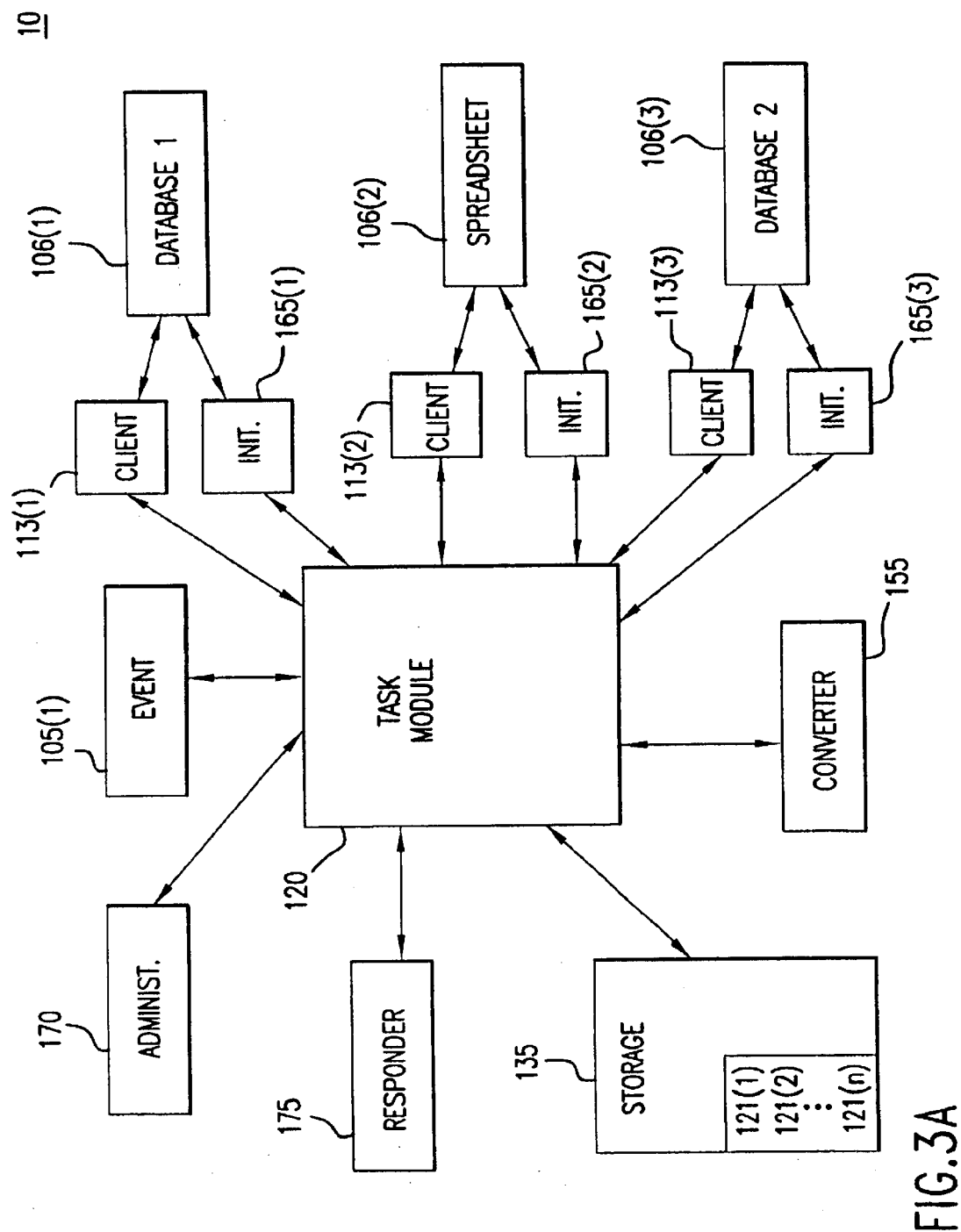
FIGS. 3A–3F illustrate the self-describing features of the present system.

FIG. 3A shows how a particular script 121(1) may be implemented by task module 120. Event data is received by task module 120, for example, from an event module 105(1). The task module 120 then interfaces with converter module 155, which performs a mapping function of the received event data to a script that will respond to the event data. The task module 120 then retrieves the corresponding script, for example, 121(1) from storage 135. Storage 135 may be used to store a plurality of scripts 121(1) ... (n).

Figure 3B:
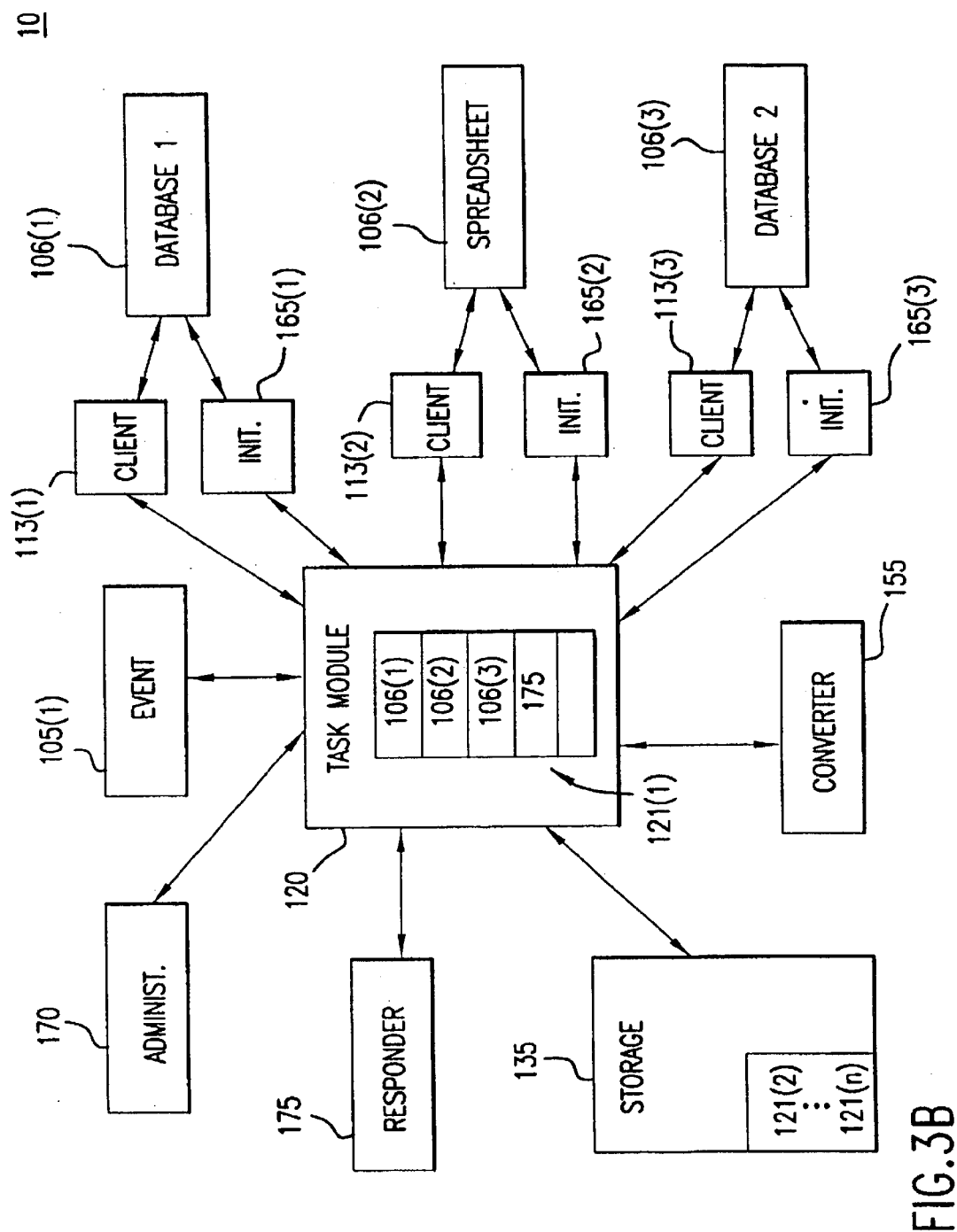

FIG. 3B shows that the task module 120 has retrieved a script 121(1) that lists a series of steps to be performed. Once the script, or series of instructions, 121(1) has been retrieved from storage 135, the task module executes the script by interacting with requisite processing modules. (This interacting may be done substantially simultaneously or sequentially depending on the nature of the data being gathered by the script 121(1).) For example, database 1 (106(1)), spreadsheet (106(2)) and database 2 (106(3)) may be the data required to respond to a particular event and therefore are the steps for the script 121(1). If the system 10 was an electronic commerce system, database 1 could be inventory, spreadsheet could be a spreadsheet calculation to create an invoice and database 2 could be the payment system.

Figure 3C:
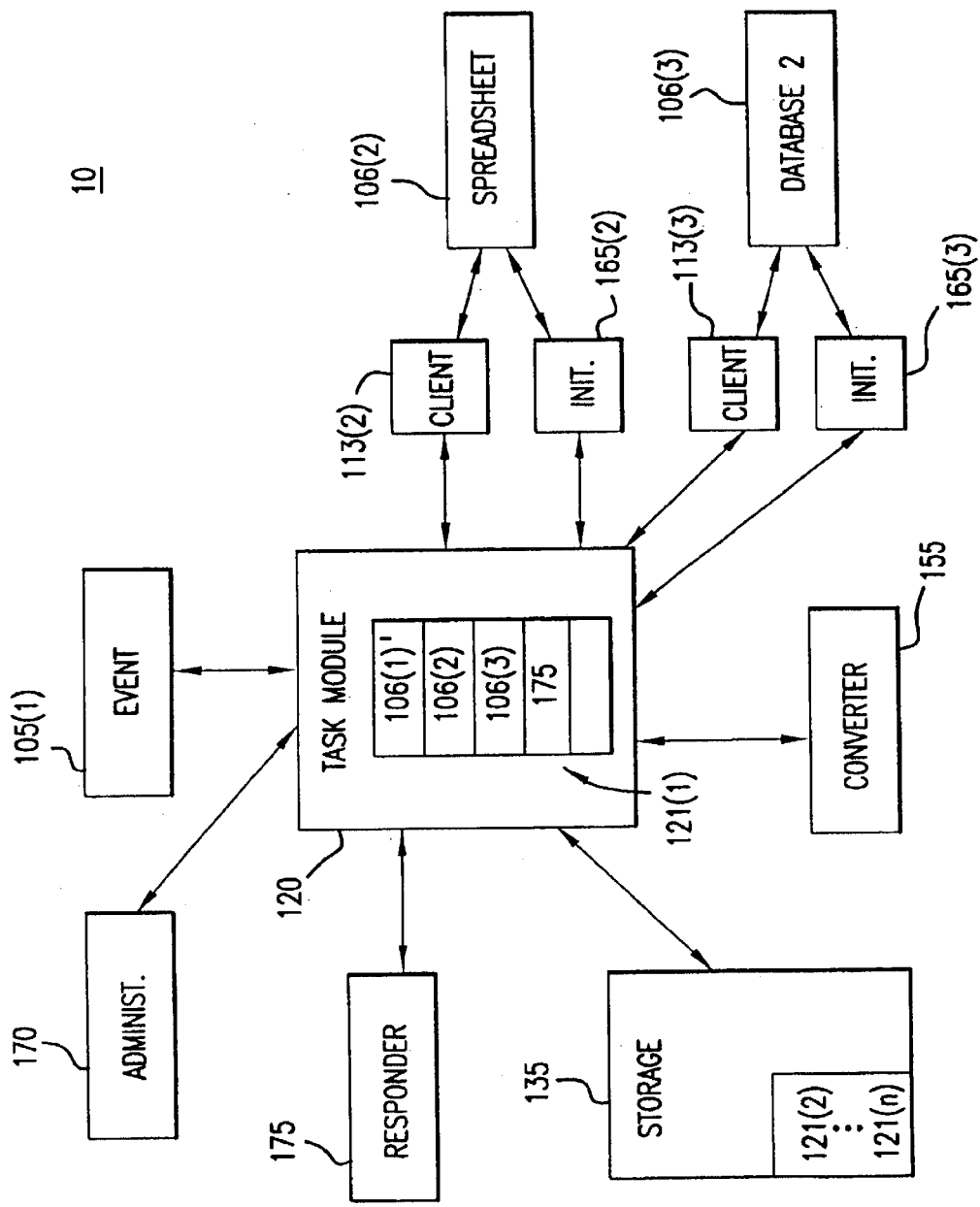

As seen in FIG. 3C, the task module 120 has already performed interfacing with initiator 165(1) (not shown) and has gathered data from processing module 106(1) (not shown), which is database 1. The gathered information from database 1, (106(1)), may be stored in storage module 135 and/or may also be stored in the script 121(1) as 106(1)'. Interfacing with database 1 required the script 121(1) to perform the necessary commands based on the logic programmed into the script 121(1). The script 121(1) utilizes the results of the commands when performing the next instruction in the script 121(1), which is gathering data from spreadsheet 106(2). Task module 120 proceeds to interface with initiator module 165(2) at database spreadsheet (106(2)) since that is the next instruction of script 121(1). The preprogrammed series of instructions 121(1) performs a list of desired functions in a specified manner. The set of instructions 121(1) in the task module 120 is iterative in nature and responds to information received by the previous instruction. Thus, the task module 120 will utilize information 106(1)' received from database 106(1) (as shown in FIG. 3B) and information received from spreadsheet (106(2)) when interfacing with database 2 (106(3)).

Referring back to FIG. 3B, since task module 120 is in parallel communication with a plurality of processing modules 106(1) ... (3), the task module 120 is receptive to event data transmitted by any of these processing modules. Task module 120 can access any peripheral module substantially concurrently to send or receive information. The task module 120 only waits to transmit data if the necessary data has not been received from another prerequisite peripheral module.

In the example that processing module 106(1) is the inventory of a product, and that inventory exceeds a pre-specified quantity, an event data signal may be transmitted from processing module 106(1) to task module 120 via client module 113(1). Task module 120 receives this data and converter 155 recognizes this event data and maps it to a corresponding script, for example, script 121(2). Task module 120 then executes the script 121(2), thereby interfacing with the requisite processing modules to respond to the event that inventory in 106(1) exceeds a pre-specified quantity. This series of instructions 121(2) might be to access another processing module, for example 106(4) (not shown), which could be the price database. The result of this may be that task module 120 sends a signal to lower the price for that particular item. The task module 120 can execute a plurality of scripts 121(1) . . . (n) substantially simultaneously.

Additionally, in a situation in which the quantity of inventory was depleted below a specified number, a processing module 106(1) (inventory database) could send a signal to the task module 120 via client module 113(1). This data would be recognized as event data and a signal would be sent to the converter module 155 for the converter 155 to map the event data to a script 121(3) (not shown). The script 121(3) would include commands to respond to a depleted inventory situation. The task module 120 would execute script 121(3) to respond to the event that inventory is depleted. One step could be that the task module 120 transmits a signal to a status monitoring module (not shown), which could inform a user that inventory is low and additional inventory is required. Thus, the task module 120 has the capability to access a script for every recognized event. The quantity and type of script utilized is based on event data received.

Figure 3D:
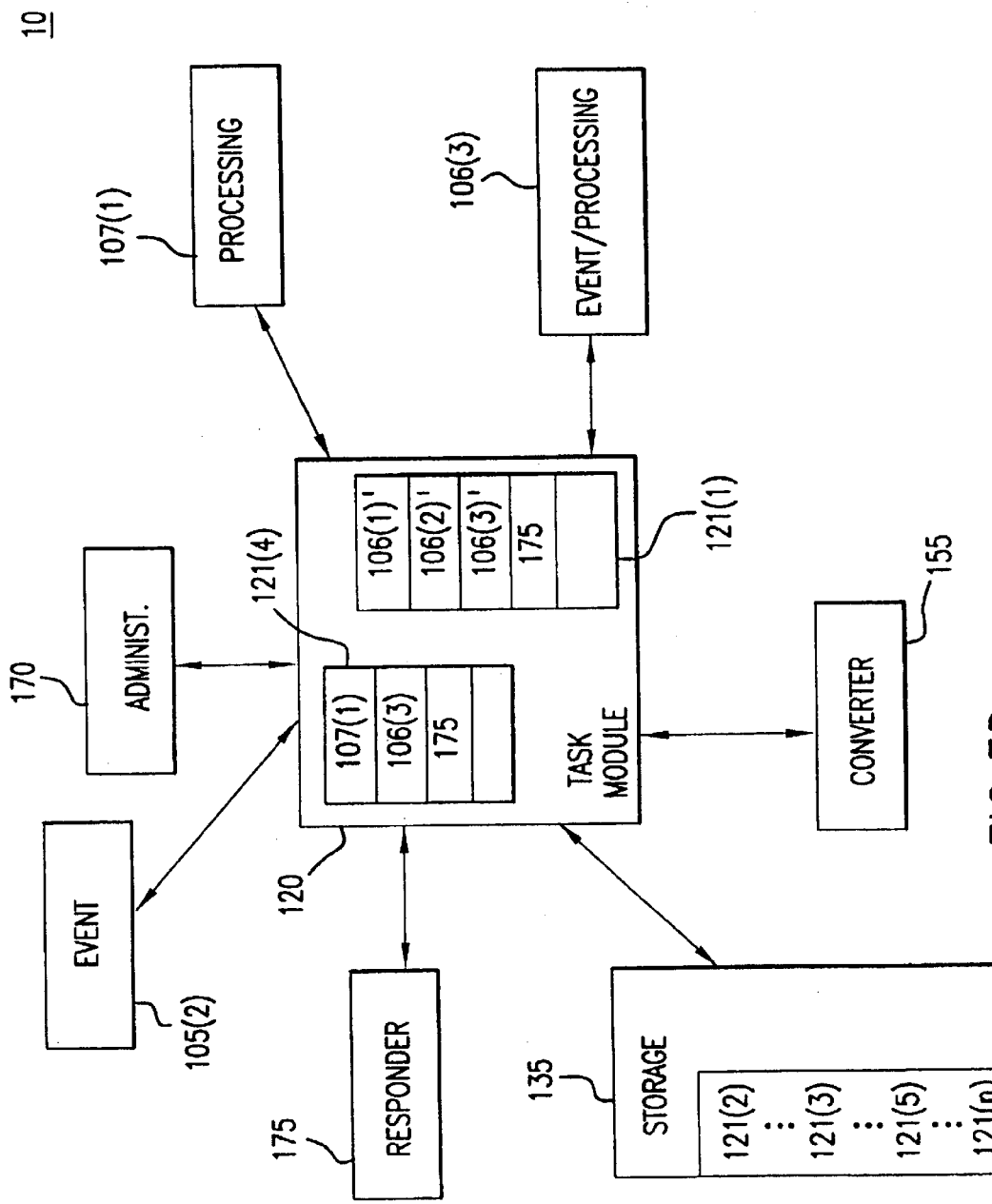

In a slightly different example as shown in FIG. 3D, involving a processing module 107(1) which can process data but cannot generate data, the task module can nonetheless utilize results generated by that processing module 107(1). When event data is generated, by event module for example, 105(2), task module 120 will receive the data and, via the converter 155, implement a series of instructions 121(4). If one of the instructions necessitates task module 120 invoking processing module 107(1), task module 120 will interface with processing module 107(1). Upon interfacing with processing module 107(1) the task module 120 will gather information and use that information to modify the series of instructions 121(4). Task module 120 will use the data gathered from 107(1) when it interfaces with processing module 106(3), which is the next command in the script 121(4). Thus, the script 121(4) utilizes the data gathered in the previous steps when executing the next step until the execution is complete.

Upon completion of a particular script, the task module 120 can store the results of the script execution in storage 135. The task module 120 may also generate a response if one is required.

Figure 3E:
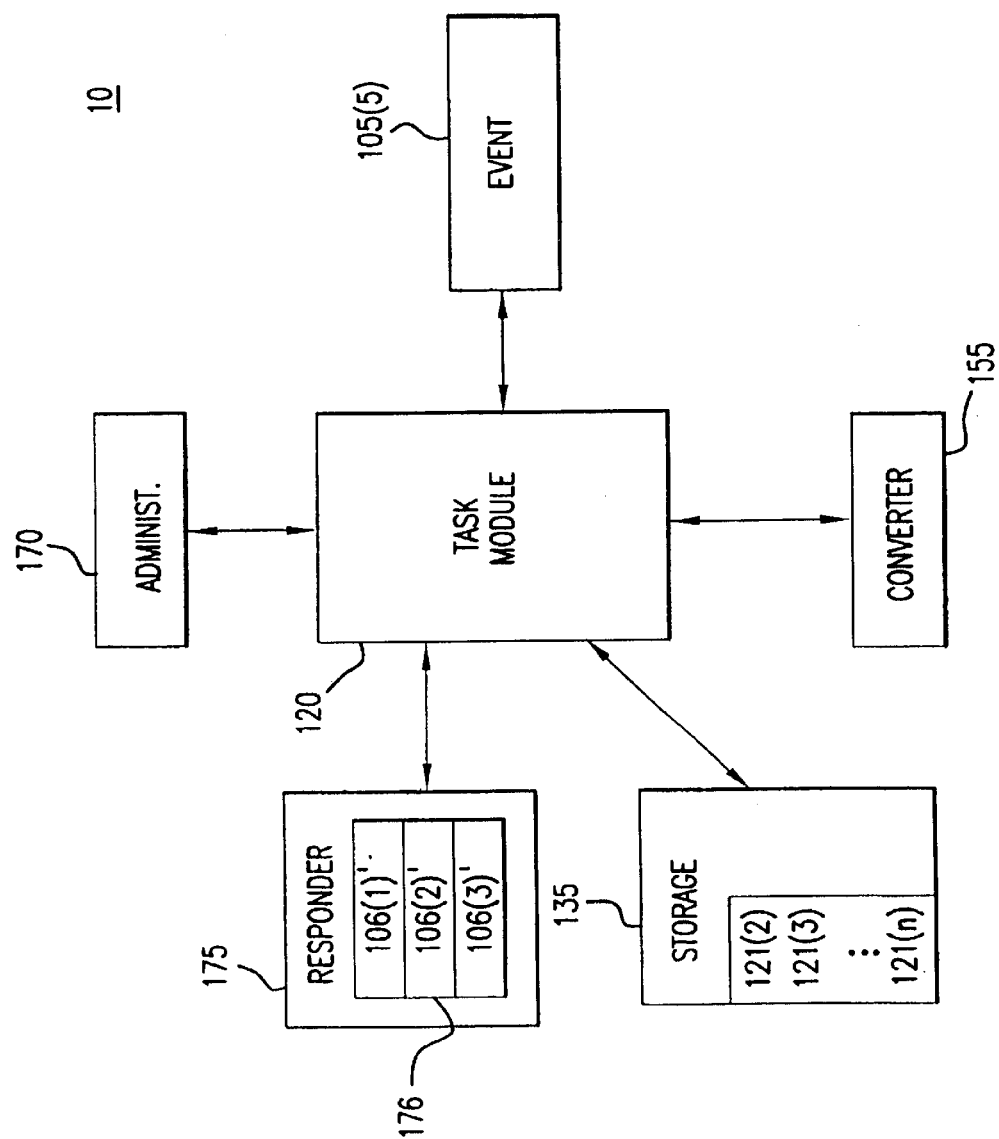

FIG. 3E shows that in some instances, event modules require a response to the event data transmitted to the task module. In these situations, upon completion of a series of instructions, the task module 120 assembles all of the data gathered from the required processing modules. If a response is desired, the script being executed accumulates information and, generally, as the last step of the script, the task module 120 interfaces with responder module 175 and provides the responder module 175 with a response profile 176, which represents the results of the execution of a script. Responder module 175 formats the response profile 176 into a format that the event module 105(5) can understand, for example a Web browser that recognizes HTML, and the task module 120 transmits the response profile 176 to the event module 105(5) in that format. Alternatively, the responder module 175 can interface directly with the event module 105(5) and provide the response profile 176 to the event module 105(5) without interfacing with the task module 120.

Figure 3F:
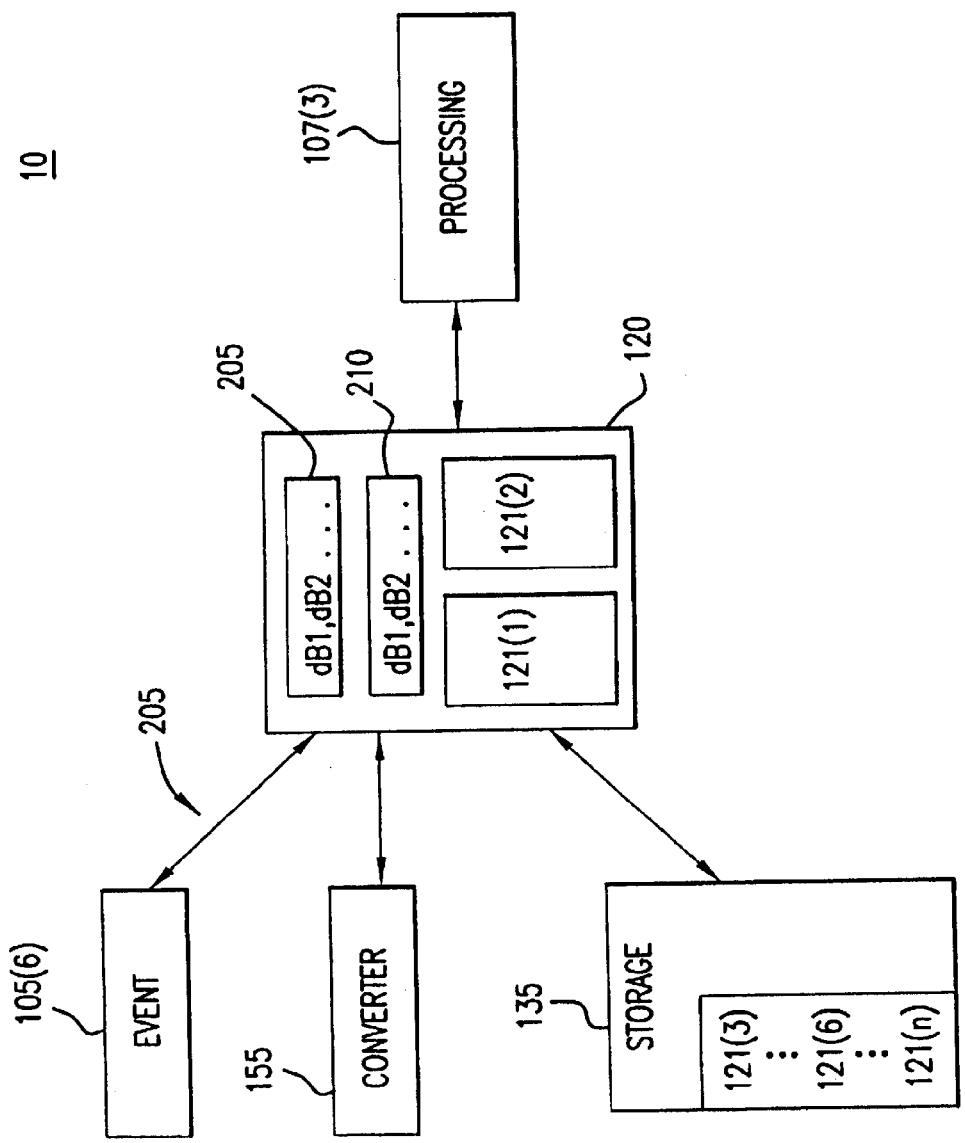

FIG. 3F shows that a script is mapped to received event data. The task module 120 receives event data 205 from, for example, event module 105(6), and utilizes converter 155 to match the event data 205 to script retrieval data 210 that can respond to the event data 205. Once a script has been determined, the task module will retrieve that script e.g. 121(6) from storage 135.

The task module 120 has the ability to execute a plurality of steps in a script substantially simultaneously, as well as execute a plurality of scripts substantially simultaneously to respond to a plurality of event data.

Figure 4:
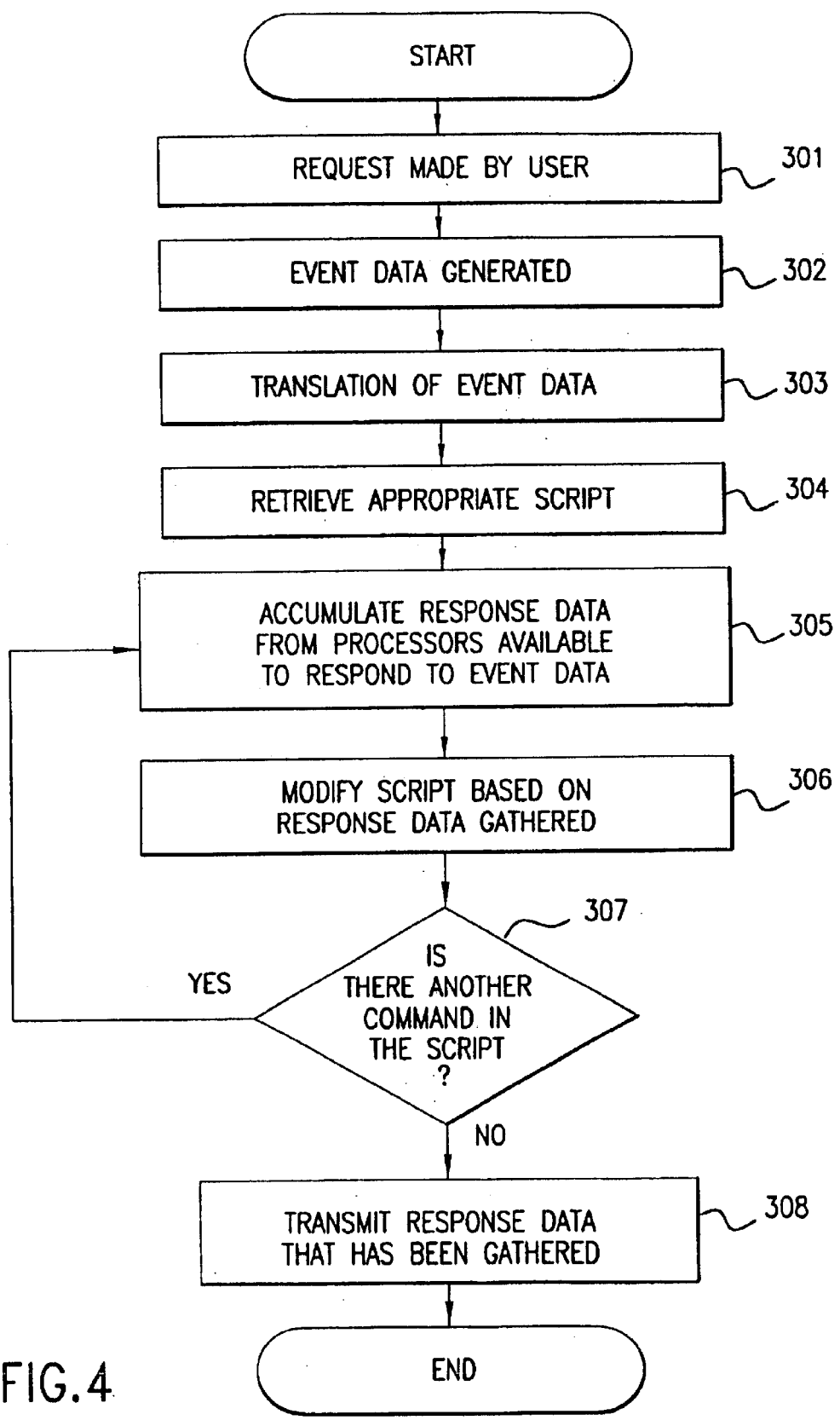
FIG. 4 is a flow chart of event data processing in accordance with this invention.

FIG. 4 shows a flow chart of steps that may be used to implement one example of the event driven data processing system. In step 301 a request is made by a user, such as a user request to place an order for a hat from a remote location through the Internet. This request is recognized as an event and event data is generated, which could be to process the order, in step 302. This event data is transmitted to a task module and the transmission can be facilitated by a client module. The task module is in communication with a converter module that translates the event data generated and maps the event data to an appropriate script in step 303. The task module then retrieves the designated script from the storage module in step 304. Execution of the script and interfacing with the processing modules required to accumulate response data to respond to the event data is performed in step 305.

It should be noted that if the processing steps are independent, the task module will substantially simultaneously execute the commands in the script.

The task module coordinates the execution of the script such that the processing modules can perform the necessary processing. As the task module executes the script, the data in the task module itself is modified and updated based upon the data gathered through the execution of the script as shown in step 306. These script steps may include, for example, ordering a desired quantity from inventory, determining the price, and processing payment for the order.

An example of executing a script would be that the first instruction to be executed is ordering the desired quantity from inventory. The task module interfaces with the processing module that has inventory information and gathers inventory data. If the inventory is depleted, the script will use that information during the further execution of the script. For example, logic statements programmed into the script enable the script to use the depleted inventory information to respond to the user. Such a response could be a message that although the inventory of hats is insufficient, other items are on sale, such as gloves or socks. The script may also be programmed to execute a series of commands to generate a rain check for the user in a depleted inventory situation.

Thus, the script is programmed to dynamically respond to data received from each of the processing modules that the script interfaces with.

If the inventory is adequate to fill the request, this information is gathered in the script, and the script proceeds to the price processing module, where price data is gathered for the quantity of hats ordered. The task module includes the quantity of inventory when it gathers data from the price module and calculates the price.

Thus, after the price is gathered from the price processing module, the script proceeds to the payment module. In this module, information about the payment method, such as a credit card account number which the purchaser provided to the system, is processed. If such information is determined to be invalid, the script will execute a series of steps such as asking for another account number, advising the user that the credit card is invalid or some other appropriate response.

The data gathering and processing steps are continued until the requisite instructions are completed as shown in decision block 307.

Once the task module has completed all the required steps in the script, the gathered data may be formatted into a desired format and output to specified modules. However, if the script does not have a response step, the accumulated data may be stored in a storage module, or otherwise disposed of. The transmission of the accumulated data to a module is shown in box 308.

Figure 5:
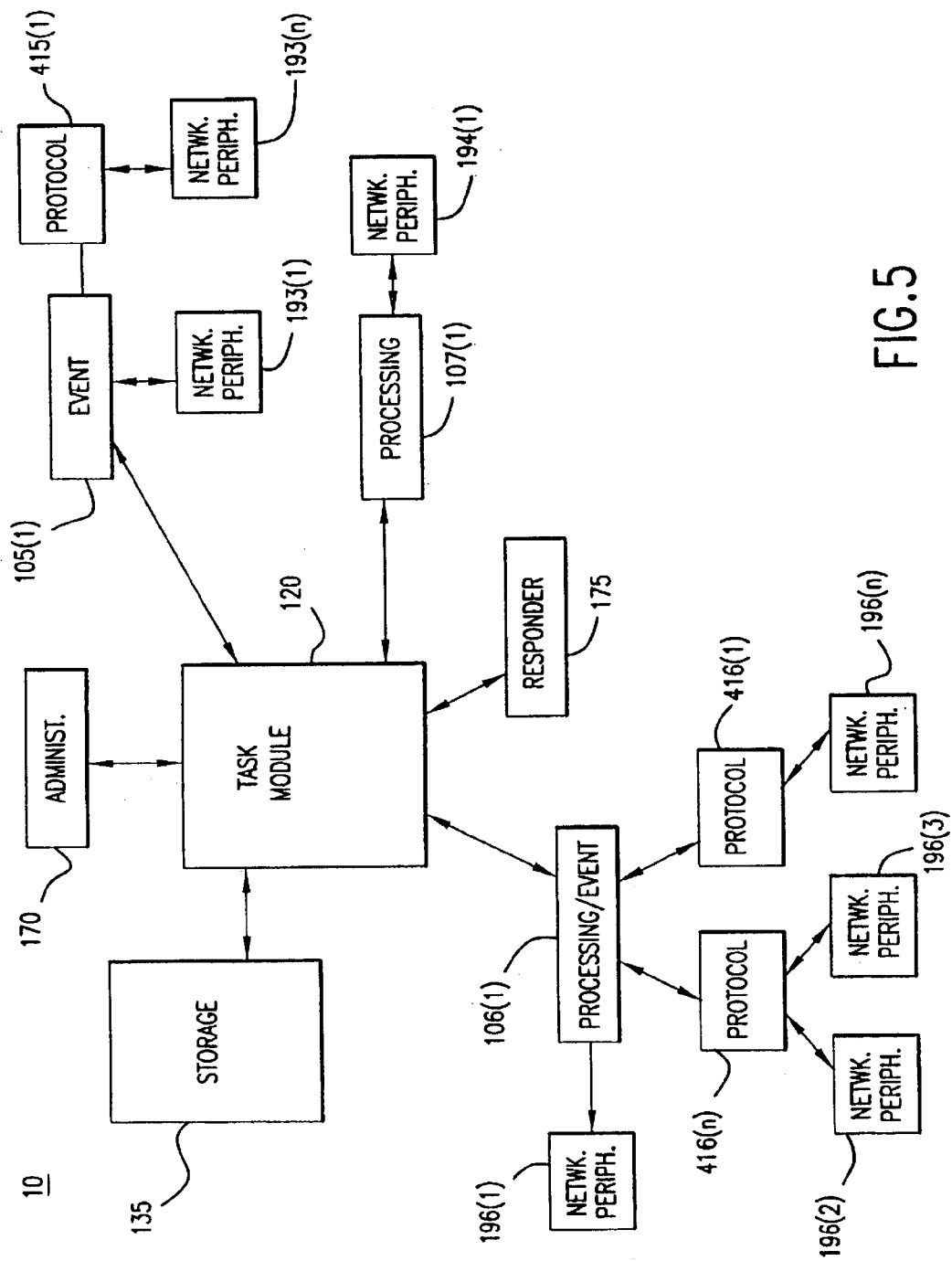
FIG. 5 shows the relationship between the task module, processing modules, event data generating modules and network peripherals.

FIG. 5 shows an embodiment of the system 10 that includes network application peripherals in communication with event modules and processing modules. Processing modules 106(1) . . . (n) and 107(1) . . . (n) and event modules 105(1) . . . (n) are not required to be dedicated, and therefore, these modules may have associated network application peripherals.

As shown in FIG. 5, event module 105(1) can have associated network application peripherals 193(1) . . . (n) (n being any integer). Processing modules 106(1) and 107(1) can have associated network application peripherals 196(1) . . . (n) and 194(1) . . . (n), respectively. Examples of network application peripherals include databases, transaction systems, and order entry systems. Protocols 415(1) . . . (n) and 416(1) . . . (n) may be used to facilitate interfacing between corresponding modules 105(1) . . . (n) and 106(1) . . . (n) respectively, and network application peripherals. Network application peripherals 193(1) . . . (n), 194(1) . . . (n), and 196(1) . . . (n) can communicate with their respective systems (e.g. 105(1) . . . (n), 107(1) . . . (n), and 106(1) . . . (n)) independently of system 10 or task module 120. The task module 120 treats modules 105(1) . . . (n), 106(1) . . . (n) and 107(1) . . . (n) as though the network application peripherals 193(1) . . . (n), 194(1) . . . (n), and 196(1) . . . (n) were non-existent. The task module 120 does not get information directly from the network application peripherals 193(1) . . . (n), 194(1) . . . (n) and 196(1) . . . (n) but merely gathers information from modules 105(1) . . . (n), 106(1) . . . (n) and 107(1) . . . (n).

Modules 105(1) . . . (n), 106(1) . . . (n) and 107(1) . . . (n), with their associated network application peripherals 193(1) . . . (n), 196(1) . . . (n), and 194(1) . . . (n), are viewed as autonomous independent systems. For example, module 106(1) may be part of a separate order production system that is functioning without any communication with task module 120. The module 106(1) has network application peripherals 196(1) . . . (n) by which module 106(1) performs processing. The task module 120 is designed to access modules such as 106(1) and use the data in that module to perform other operations.

Figure 6:
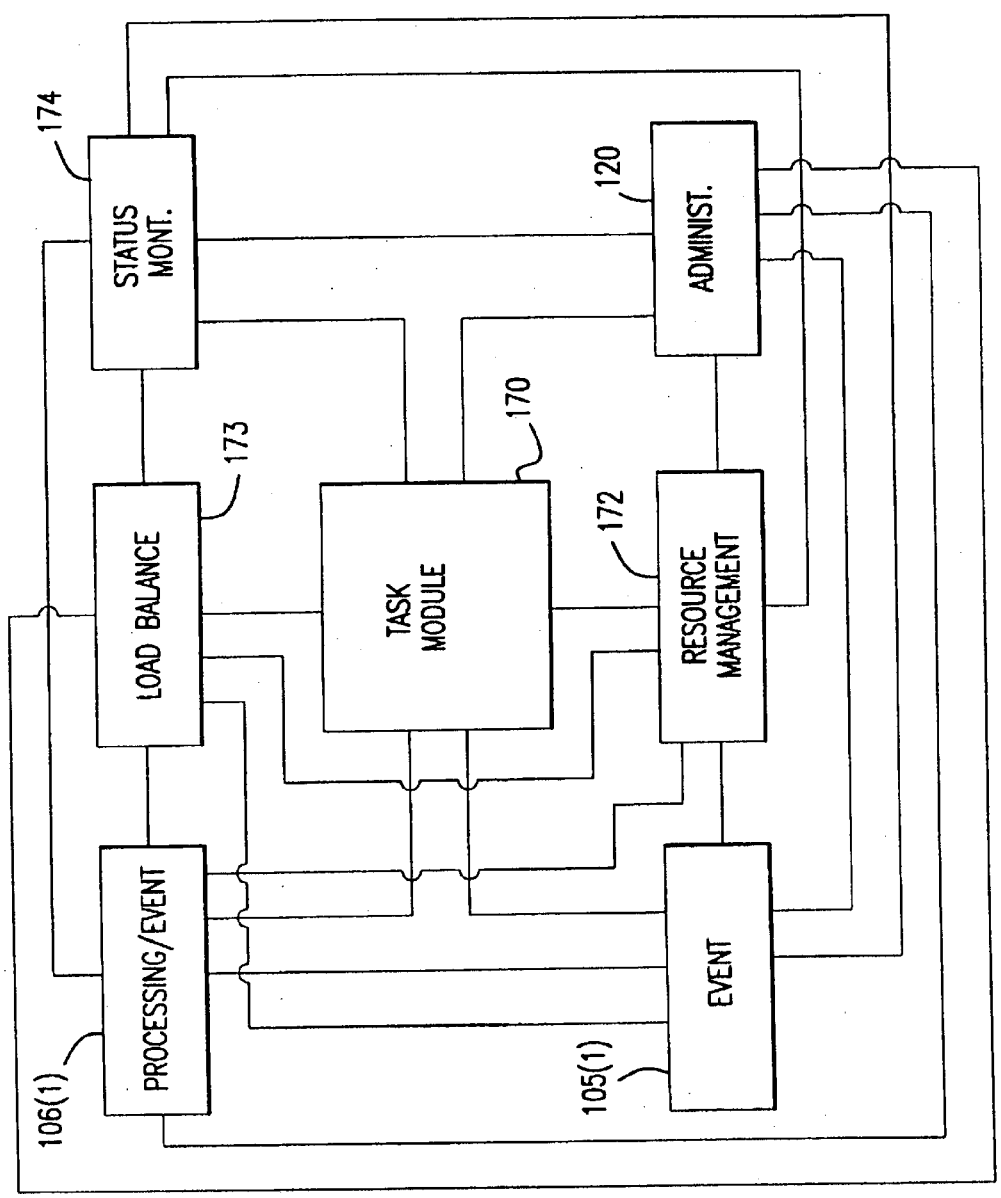
FIG. 6 shows an embodiment by which the peripheral modules can communicate with one another.

FIG. 6 shows an example of how peripheral modules may be in communication with each other, as well as in communication with the task module 120. The spoke-and-hub configuration with peripheral modules in communication with each other permits the peripheral modules to transmit and receive data from one another without necessarily involving the task module 120.

As shown in FIG. 6, resource management module 172 can interface with processing module 106(1) and gather information related to the function of processing module 106(1). Load balancing module 173 can then interface with both processing module 106(1) and resource management module 172 and thereby determine where to send the next request for a particular script being executed by task module 120. Administrative module 170 can interface directly with processing-module 106(1) and event module 105(1) to determine when event data is generated by event module 105(1) or 106(1) without necessarily utilizing task module 120.

Thus, the configuration as shown in FIG. 6 enables a plurality of peripheral modules to directly interface with each other. This can provide a more efficient system in those circumstances in which the task module 120 does not need to be involved with every interface between peripheral modules.

The modules shown in FIG. 6 are merely examples of modules that can communicate directly with other modules. The invention is not limited to only those modules illustrated in FIG. 6.

Figure 7A:
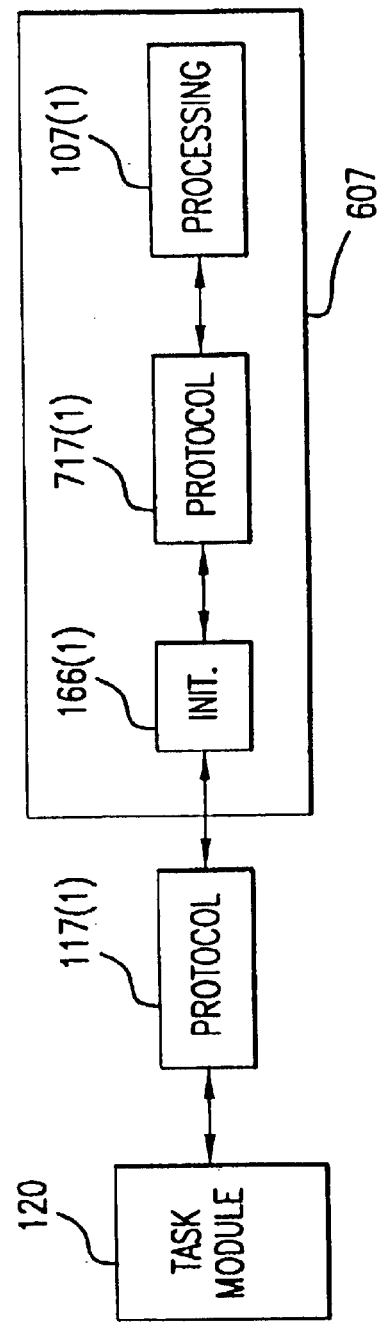
FIGS. 7A and 7B illustrate protocol interface configurations between peripheral modules and the task module.

FIG. 7A shows one type of interface between task module 120 and processing module 107(1). The initiator module 166(1) may be running on the same computer as processing module 107(1). In this situation protocol 117(1) may interface with task module 120 and module 607, which includes initiator module 166(1) and processing module 107(1). An example of protocol 117(1) is TCP/IP. A second protocol 717(1) may interface between the initiator module 166(1) and the processing module 107(1). An example of protocol 717(1) is inter-process communication, possibly through shared memory.

Figure 7B:
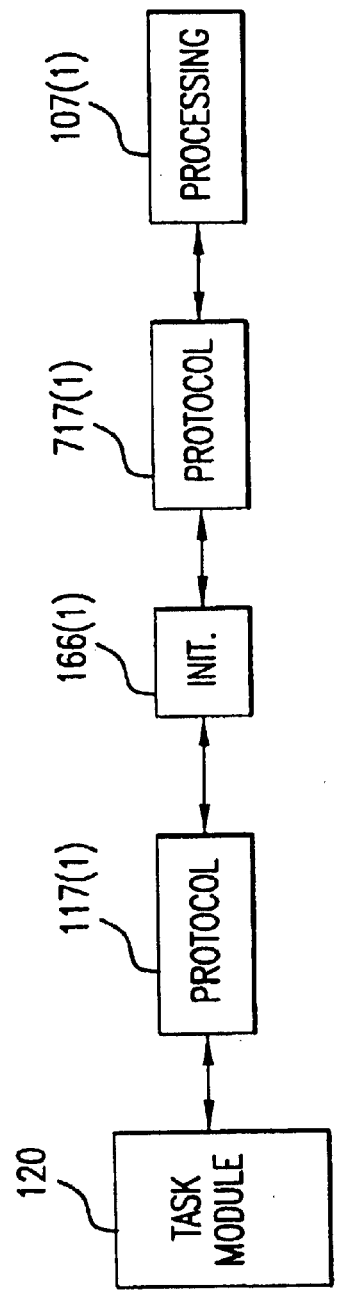

FIG. 7B shows a second type of communication link between task module 120 and processing module 107(1). In this embodiment processing module 107(1) and initiator module 166(1) are not running on the same computer. Task module 120 can communicate with processing module 107 (1) through two protocols 117(1) and 717(1). Protocol 117(1) interfaces with task module 120 and initiator module 166(1). The type of protocol may be, for example, TCP/IP.

As can be seen, the initiator module 166(1) may be running on a separate machine from the processing module 107(1) and utilize a second protocol 717(1), which interfaces with initiator module 166(1) and processing module 107(1). Protocol 717(1) may be, for example, Corba, TCP/IP, COM (COM is a registered trademark of Microsoft Corp. of Redmond, Wash.).

It should be noted that a protocol interface arrangement as described in FIGS. 7A and 7B may also be used between the task module and other peripheral modules. For example, a client module could be substituted for the initiator module with an event module being substituted for the processing module. It should also be noted that the modules in system 10, although illustrated as discrete modules, could also be combined to run on the same computer.

Figure 8A:
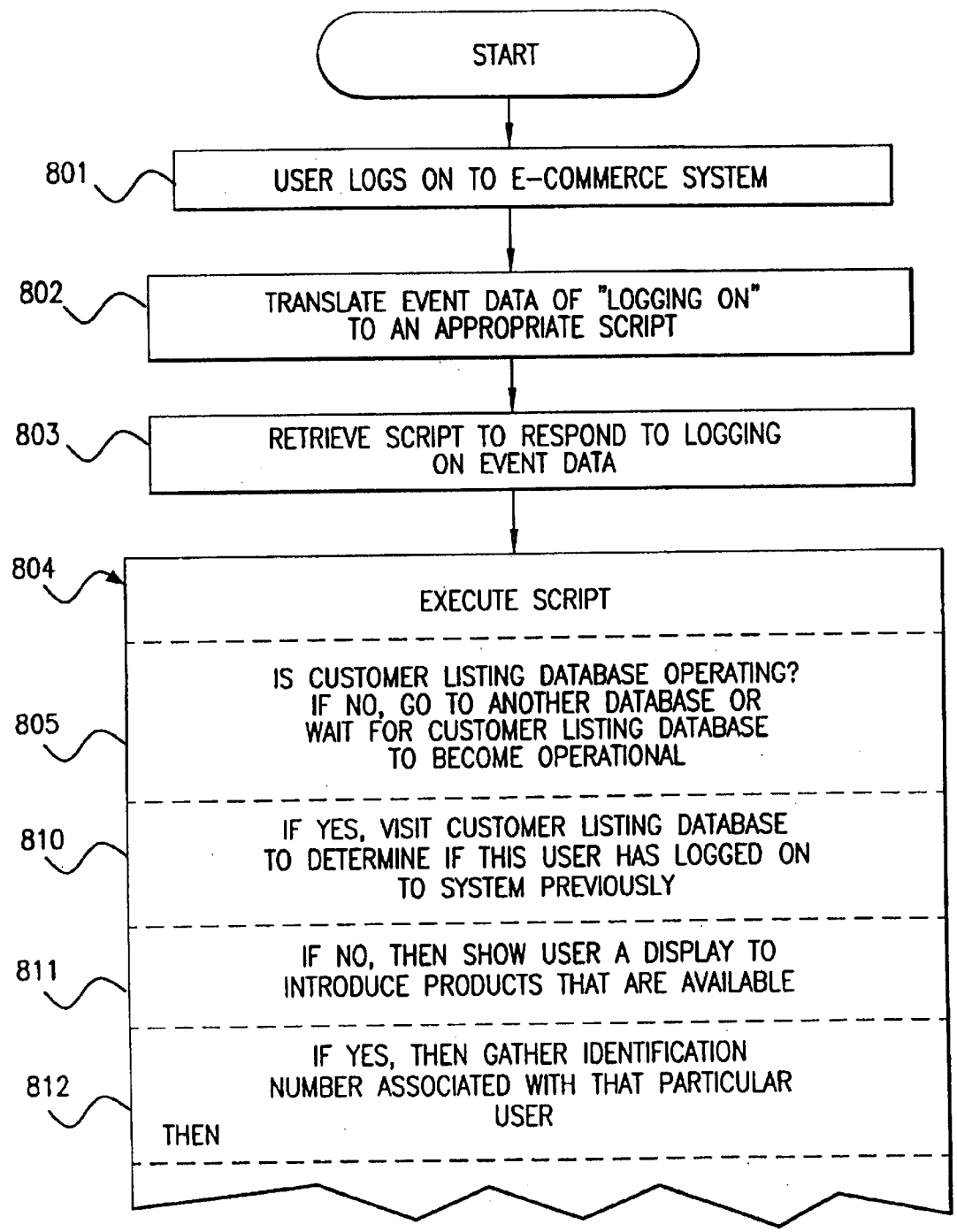
FIGS. 8A and 8B illustrate the event data processing steps of this invention using a specific example.
Figure 8B:
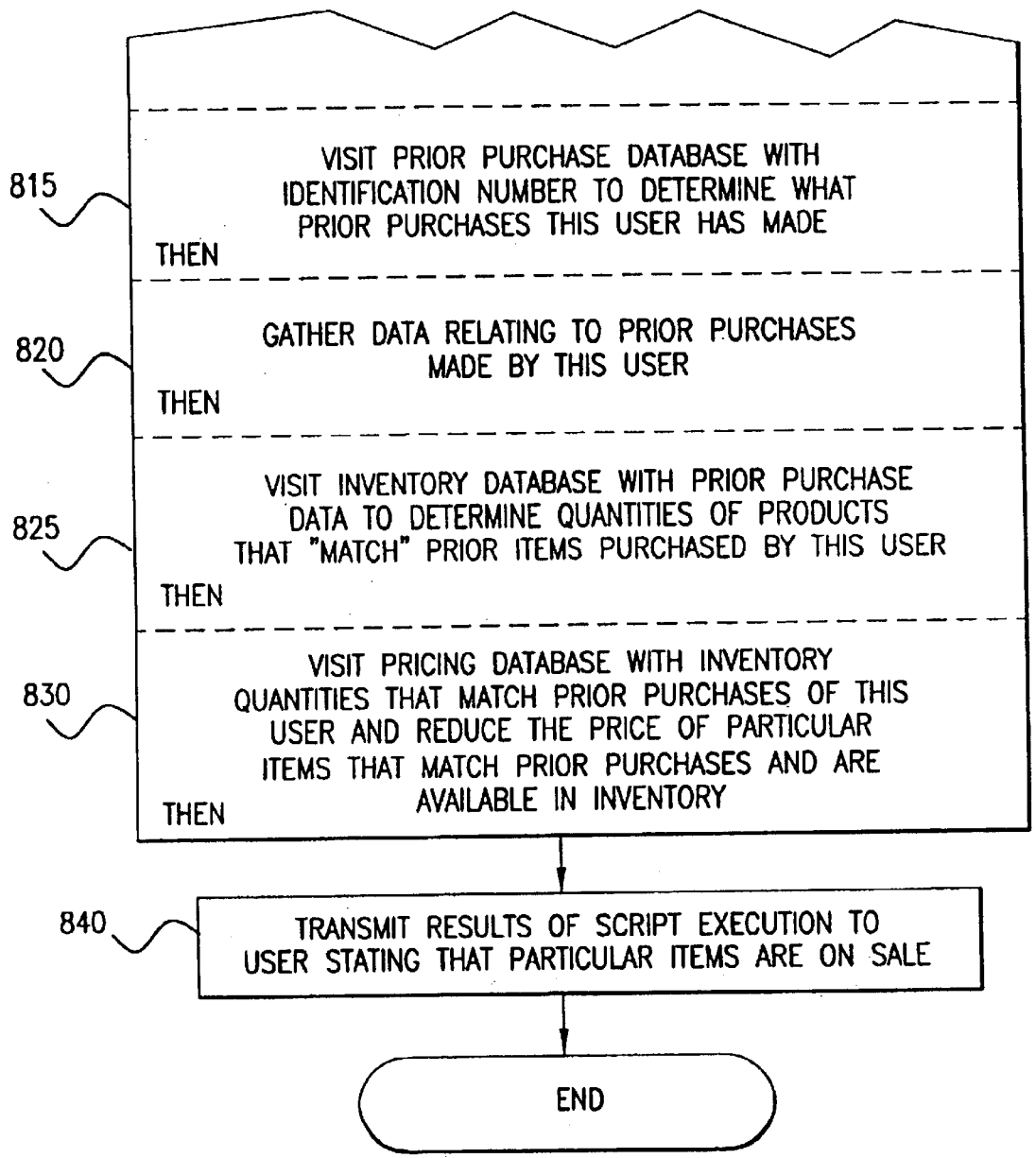

The following discussion uses FIGS. 8A and 8B to illustrate a possible implementation of the present invention. This discussion is intended to illustrate, but in no way limit the scope of the present invention.

As shown FIG. 8A box 801, a user at a personal computer may log onto an electronic commerce system, offering a wide variety of products for sale. The user logging onto the system is received by the task module as event data. This event of a user logging on is mapped to an appropriate script in box 802. The appropriate script is retrieved from storage in box 803.

The retrieved script is then executed in box 804. The execution requires performing the instructions programmed onto the retrieved script.

The first instruction of the script may be to check if a customer database is operational as shown in box 805. This can be done by interfacing with a status-monitoring module. If the database is not operational, the script may wait for the database to become operational or attempt to access another database. If the database is operational, the next instruction in the script might be to check a database of customer listings to determine if this user has logged onto the system previously as shown in box 810. A processing module could be a database that stores identification of users who have logged onto the system in the past.

If the user is a new customer, a step in the script could be to display available products to the user as shown in box 811.

If upon interfacing with the customer listing database the user is identified as a repeat visitor, the script will then use the fact that the user is a repeat customer to gather an identification number associated with that particular user as shown in box 812.

As shown in FIG. 8B, the next step could be to interface with or "visit" a prior purchase database, as shown in box 815, which could be a database that stores information relating to prior purchases of particular users. The script would utilize the user identification information gathered from the previous processing step to gather information relating to prior purchases of the particular user. It may be that this user has purchased outdoor products that are red-colored in the past. This step is shown in box 820.

The next instruction in script could be to interface with or "visit" a processing module that could be an inventory database, as shown in box 825. The script could provide the prior purchasing information, such as the fact that this user has previously purchased red-colored outdoor products, to the inventory database to determine what products in inventory are outdoor products or red-colored products and whether the quantity of any of those products exceeds a particular number.

After gathering inventory data in box 825, the script may then "visit" a pricing database in box 830 with the gathered information. The script could include a command to reduce the price on items gathered from visiting the inventory database.

The next step in the script could be to provide a listing of available products in inventory that are red-colored or outdoor products to the user and note that these products are being offered to the user at a reduced price. This listing of products that the user may be interested in purchasing, based on prior purchases could be transmitted to the user, as shown in box 840.

Thus, one embodiment of the present invention can be the generation of a specific list of products a user may be interested in purchasing whenever the user logs onto an electronic commerce system.

While this disclosure describes particular embodiments of the invention, it is to be understood that the invention is capable of use in various other combinations or modifications within the scope of the inventive concept as expressed herein.

What is claimed is:

1. A data processing system comprising:
    a plurality of event modules each including code that generates an event data signal representative of a particular event;
    a plurality of scripts each having a plurality of instructions, each of said scripts invoked to perform a function in response to a corresponding one of said event data signals;
    a plurality of processing modules distributed over said data processing system each including code that provides processed data; and
    a task module, selectively communicating with each of said plurality of event modules and said plurality of distributed processing modules, said task module including code for selecting one of said plurality of scripts that corresponds to said event data signal and for executing said selected script such that said selected script proceeds to a first of said plurality of distributed processing modules for processing a current one of said plurality of instructions;
    wherein dynamic information comprises statuses of said distributed processing modules aid modifications to said selected script including processed data from previously processed ones of said plurality of instructions, and wherein during execution of said selected script said task module provides said dynamic information to said selected script, said selected script incorporating said dynamic information into said currently processing instruction for consideration thereof, and
    upon completion of said currently processing instruction of said selected script said selected script evaluates said incorporated dynamic information provided by said task module and processed data from said completed instruction and selectively executes a next one of said plurality of instructions of said selected script, and wherein said task module, utilizing said dynamic information interacts with said plurality of distributed processing modules for selecting a second available one of said plurality of distributed processing modules such that said selected script proceeds to said second available one of said distributed processing modules for processing said next instruction within said selected script.

2. The system as claimed in claim 1 wherein said task module executes two or more of said plurality of scripts substantially simultaneously.

3. The system as claimed in claim 2 further comprising:
    a converter module, in communication with said task module, including code that maps said event data signal to at least one of said two or more of said plurality of scripts upon reception of said event data signal by said task module.

4. The system as claimed in claim 1 when said plurality of distributed processing modules provide event data signals, representative of particular events, to said task module.

5. The system as claimed in claim 1 further comprising:
    a status monitoring module, in communication with said task module, including code that provides said status information to said task module including operation conditions of said plurality of distributed processing modules.

6. The system as claimed in claim 5 wherein said status monitoring module is in direct communication with said plurality of distributed processing modules.

7. The system as claimed in claim 5 wherein during said execution of said selected script, said status monitoring module stores data associated with said selected script in an associated memory.

8. The system as claimed in claim 1 further comprising:
a load balancing module, in communication with said task module, including code that dynamically selects available ones of said plurality of distributed processing modules to perform processing.

9. The system as claimed in claim 8 wherein said load balancing module is in direct communication with said plurality of distributed processing modules.

10. The system as claimed in claim 1 wherein said task module interfaces with said plurality of distributed processing modules for bi-directionally and substantially simultaneously transmitting data between said plurality of distributed processing modules and said task module.

11. The system as claimed in claim 1 further comprising:
a resource management module, in communication with said task module, including code for monitoring event data signals generated by said plurality of event modules and not processed by said task module and a number of said plurality of distributed processing modules available for perform particular data processing functionality, and for converting data processing functionality of said plurality of distributed processing modules in response to dynamic information regarding said monitored event data signals and said number of available distributed processing modules to maximize a number of said distributed processing modules processing said event data signals.

12. The system as claimed in claim 11 wherein said resource management module is in direct communication with said plurality of distributed processing modules.

13. The system as claimed in claim 1 further comprising:
a plurality of initiator modules including code that provides a communication interface between an associated one of said plurality of distributed processing modules and said task module.

14. The system as claimed in claim 13 wherein each of said plurality of initiator modules communicates with said associated one of said plurality of distributed processing modules regardless of native applications contained on said associated one of said plurality of distributed processing nodules.

15. The system as claimed in claim 13 further comprising:
a protocol disposed between each of said plurality of initiator modules and said task module for providing a communication interface therebetween.

16. The system as claimed in claim 13 further comprising:
a protocol disposed between each of said plurality of initiator modules and said associated one of said plurality of distributed processing modules for providing a communication interface therebetween.

17. The system as claimed in claim 1 further comprising:
a plurality of client modules including code that provides a communication interface between an associated one of said plurality of event modules and said task module.

18. The system as described in claim 17 further comprising:
a protocol disposed between said task module and each of said plurality of client modules for providing a communication interface therebetween.

19. The system as claimed in claim 17 further comprising:
a protocol disposed between each of said plurality of client modules and said associated one of said plurality of event modules for providing a communication interface therebetween.

20. The system as claimed in claim 1 wherein each of said plurality of scripts is programmed to iteratively update its contents.

21. The system as claimed in claim 1 further comprising:
a storage module, in communication with said task module, for providing storage for said system.

22. The system as claimed in claim 21 wherein said storage module comprises a computer-readable medium.

23. The system as claimed in claim 22 wherein said computer readable medium comprises a persistent memory.

24. The system as claimed in claim 21 further comprising:
a script building module, in communication with said storage module, including code that creates said plurality of scripts.

25. The system as claimed in claim 24 wherein said script building module includes a standard language interface.

26. The system as chimed in claim 24 wherein said script building module includes a graphical user interface.

27. The system as claimed in claim 24 wherein said script building module dynamically updates and modifies said plurality of scripts.

28. The system as claimed in claim 1 further comprising:
a protocol for providing a communication interface between said task module and each of said plurality of event modules.

29. The system as claimed in claim 1 further comprising:
a protocol for providing a communication interface between said task module and each of said plurality of distributed processing modules.

30. The system as claimed in claim 1 further comprising:
a responder module, in communication with said task module, including code that transmits response data, resulting from said execution, from said task module in a particular format to said plurality of distributed processing modules or in a particular format to said plurality of event modules.

31. The system as claimed in claim 1 further comprising:
an administrative module, in communication with said task module, including code that receives and presents data that relates to said plurality of distributed processing modules.

32. The system as claimed in claim 1 further comprising:
a plurality of application peripherals in communication with an associated one of said plurality of distributed processing modules or an associated one of said plurality of event modules.

33. A data processing system, comprising:
a plurality of event modules each including code that generates an event data signal representative of a particular event;
a plurality of scripts each having a plurality of instructions, each of said scripts invoked to perform a function in response to a corresponding one of said event data signals;
a plurality of processing modules distributed over said data processing system each including code for performing data processing functionality to provide pressed data;
a task module, selectively communicating with each of said plurality of event modules and said plurality of distributed processing modules, said task module including code for selecting one of said plurality of scripts that correspond to said event data signal and, during execution of said selected script, for providing dynamic information comprising statuses of said distributed processing modules and modifications to said selected script including processed data from previously processed ones of said plurality of instructions, said selected script incorporating said dynamic information into said currently processing instruction for consideration thereof and, upon completion of said currently processing instruction of said selected script, said selected script evaluates said incorporated dynamic information provided by said task module and processed data from said completed instruction and selectively executes a next one of said plurality of instructions of said selected script, and wherein said task module, utilizing said dynamic information, interacts with said plurality of distributed processing modules for selecting a second available one of said plurality of distributed processing modules such that said selected script proceeds to a said second available one of said distributed processing modules for processing said next instruction within said selected script; and a resource management module communicating with each of said plurality of event modules, said task module and said plurality of distributed processing modules, said resource management module including code for monitoring event data signed generated by said plurality of event modules and not processed by said task module and a number of said plurality of distributed processing modules available for performing particular data processing functionality, and for converting data processing functionality of said plurality of distributed processing modules in response to dynamic information regarding said monitored event data signals and said number of available distributed processing modules to maximize a number of said distributed processing modules processing said event data signals.

34. A method of data processing comprising the steps of:

generating at least one event data signal at one or more peripheral modules;

mapping said at least one event data signal to a selected script chosen from one or more scripts, each said one or more scripts having a plurality of instructions, each of said scripts invoked to perform a function in response to a corresponding one of said at least one event data signal; and executing, by a task module, said selected script such that said selected script proceeds to a first of a plurality of processing modules for processing a current one of said plurality of instructions of said selected script;

wherein dynamic information comprises of said plurality of processing modules and modifications to said selected script including processed data from previously processed ones of said plurality of instructions, and wherein during execution of said selected script said task module provides said dynamic information to said selected script, said selected script incorporating said dynamic information into said currently processing ones of said plurality of instructions for consideration thereof, and upon completion of said flunky processing instruction of said selected script, said selected script evaluates said incorporated dynamic information provided by said task module and processed data from said completed instruction and selectively executes a next one of said plurality of instructions of said selected script, and wherein said task module, utilizing said dynamic information, interacts with said plurality of processing modules for selecting a second available one of said plurality of processing modules such that said selected script proceeds to said second available one of said plurality of processing modules for processing said next one of said plurality of instructions within said selected script.

35. The method as claimed in claim 34 wherein said one or more peripheral modules and said task module communicate via a communication interface.

36. The method as claimed in claim 34 further comprising the step of:

dynamically managing operating functions of said one or more peripheral modules.

37. The method as claimed in claim 34 further comprising the steps of:

producing response data signals as a result of said execution of said selected script; and transmitting said response data signals from said task module to selected ones of said one or more peripheral modules.

38. The method as claimed in claim 37 further comprising the step of:

translating said response data signals transmitted from said task module into a format that said selected ones of said one or more peripheral modules recognize.

39. The method as claimed in claim 38 further comprising the step of:

storing said event data signals, said one or more scripts and said response data signals in a storage medium that is in communication with said task module.

40. The method as claimed in claim 39 wherein said storage medium is persistent.

41. The method as claimed in claim 34 further comprising the step of:

accessing a protocol to interface between said task module and selected ones of said one or more peripheral modules.

42. The method as claimed in claim 34 further comprising the step of:

providing communication between said task module and each of said plurality of processing modules such that said selected script proceeds to only ones of said plurality of processing modules available for performing processing operations.

43. The method as claimed in claim 34 wherein said executing step includes the step of:

interfacing with a plurality of said one or more peripheral modules substantially simultaneously.

44. The method as claimed in claim 34 wherein said executing step executes a plurality of said one or more scripts substantially simultaneously.

45. The method as claim in claim 34 wherein said execution of said one or more instructions dynamically incorporates data gathered in previously executed instructions.

46. The method as claimed in claim 34 further comprising the step of:

providing results of said executing step to an administrative module for presenting information relating to said one or more peripheral modules.

47. In a data processing system, a method for responding to event data, comprising:

receiving event data from a requesting one of a plurality of event modules;

mapping the event data to a selected one of a plurality of scripts, the plurality of scripts including instructions for responding to event data;

executing, by a task module, the selected script such that the selected script proceeds to a first of a plurality of processing modules for processing of a current one of the instructions of the selected script;

wherein dynamic information comprises statuses of the plurality of processing modules and modifications to the selected script including processed data from previously processed ones of the instructions, and wherein during the execution of the selected script the task module provides the dynamic information to the selected script, selected script incorporating the dynamic information into the currently processing instruction for consideration thereof, and upon completion of the currently processing instruction of the selected script, the selected script evaluates the incorporated dynamic information provided by the task module and processed data from the completed instruction and selectively executes a next one of the plurality of instructions of the selected script, and wherein said task module, utilizing the dynamic information, interacts with the plurality of processing modules for selecting a second available one of the plurality of processing modules such that the selected script proceeds to the second available one of the plurality of processing modules for processing next one of the plurality of instructions within the selected script;

building a response profile including results generated during execution of the selected script; and wherein when the instructions within the selected script are completed, transmitting the response profile to the requesting one of the plurality of event modules.

48. The method as claimed in claim 47 wherein the generated results include event data.

49. The method as claimed in claim 47, comprising:

tracing execution of the instructions within the selected script and processing of the processing modules; and wherein when a processing module falls, continuing execution of the selected script and the processing of the processing modules from a last traced instruction.

50. A data processing system, comprising:

a plurality of event modules each including code that generates a first event data signal representative of a first event;

a plurality of scripts each having a plurality of instructions, each of said scripts invoked to perform a function in response to a corresponding one of said first event data signals;

a plurality of processing modules each including code that provides processed data, a subset of said plurality of processing modules having code that selectively generates a second event data signal representative of a second event; and a task module, selectively communicating with each of said plurality of event modules and said plurality of processing modules, said task module including code for selecting ones of said plurality of scripts that corresponds to said first and second event data signals, and for executing said selected scripts such that said selected scripts proceed to a first of said plurality of processing modules for processing a current one of said plurality of instructions;

wherein dynamic information comprises statuses of said plurality of processing modules and modifications to said selected scripts including processed data from previously processed instructions, and wherein during execution of said selected scripts, said task module provides said dynamic information to said selected scripts incorporating said dynamic information into said currently processing is ons for consideration thereof, and upon completion of said currently processing instructions of said selected script, said selected script evaluates said incorporated dynamic information provided by said task module and processed data from said completed instructions and selectively executes a next one of said plurality of instructions of said selected script, and wherein said task module, utilizing said dynamic information, interacts with said plurality of processing modules for selecting a second available one of said plurality of processing modules such that said selected scripts proceed to said second available one of said plurality of processing modules for processing of said next one of the plurality of instructions within said selected scripts.

* * * * *